United States Patent [19]

Koopman

[11] Patent Number: 5,436,901
[45] Date of Patent: Jul. 25, 1995

[54] SYNCHRONOUS TIME DIVISION MULTIPLEXING USING JAM-BASED FRAME SYNCHRONIZATION

[75] Inventor: Philip J. Koopman, Hebron, Conn.

[73] Assignee: Otis Elevator Company, Farmington, Conn.

[21] Appl. No.: 202,870

[22] Filed: Feb. 25, 1994

Related U.S. Application Data

[63] Continuation of Ser. No. 992,879, Dec. 21, 1992, abandoned.

[51] Int. Cl.⁶ .............................................. H04J 3/06
[52] U.S. Cl. .................................. 370/85.1; 370/100.1
[58] Field of Search ............. 370/100.1, 105.4, 105.5, 370/85.1, 85.2, 85.3, 85.5, 95.1, 95.2, 95.3, 103, 85.9, 85.11; 375/107, 111

[56] References Cited

U.S. PATENT DOCUMENTS

| | | | |
|---|---|---|---|
| 4,438,520 | 3/1984 | Saltzer | 370/110.1 |
| 4,603,418 | 7/1986 | Townsend | 370/95.3 |
| 4,606,022 | 8/1986 | Suzuki et al. | 370/85.1 |
| 4,631,721 | 12/1986 | Ono et al. | 370/85.9 |
| 4,646,291 | 2/1987 | Perntz et al. | 370/85.9 |
| 4,674,084 | 6/1987 | Suzuki et al. | 370/100.1 |
| 4,901,348 | 2/1990 | Nichols et al. | 370/85.2 |
| 4,907,222 | 3/1990 | Slavik | 370/100.1 |
| 4,987,571 | 1/1991 | Haymond et al. | 370/85.2 |
| 5,189,670 | 2/1993 | Inglis | 370/100.1 |

Primary Examiner—Douglas W. Olms
Assistant Examiner—Chau T. Nguyen

[57] ABSTRACT

If a transceiver has a message to send during an idle medium condition, it transmits a jam pattern onto the medium for a predetermined time (based on maximum network propagation delay). If a transceiver detects a jamming pattern, it inhibits its own transmissions and waits for the end of the jamming pattern. If multiple transceivers begin jamming within a propagation delay of each other (within the network vulnerable time), their jamming transmissions will not destructively interfere with each other. When jamming ceases, all transceivers begin a time slice progression. Thus, the end of the jamming period when all transceivers have finished jamming serves as a network-wide synchronization for the start of an implicit token time slice progression.

2 Claims, 17 Drawing Sheets

FSD FOR SYNCHRONOUS TIME DIVISION MULTIPLEXING PROTOCOL (SYNCHRONOUS TDM).

A PLURALITY OF TRANSMITTERS AND RECEIVERS COUPLED TO A COMMAN COMMUNICATIONS MEDIUM.

FSD FOR SYNCHRONIZATION OF MULTIPLE TRANSMITTERS.

FSD FOR SYNCHRONOUS TIME DIVISION MULTIPLEXING PROTOCOL (SYNCHRONOUS TDM).

FSD FOR BUS MASTER ARBITRATION.

FSD FOR EXPLICIT TOKEN BUS PROTOCOL.

FSD FOR RESERVATION CSMA PROTOCOL WITH PER-MESSAGE RESTART.

FSD FOR MULTI-LEVEL BUS MASTER ARBITRATION.

FSD FOR RCSMA PROTOCOL WITH MULTI-LEVEL ARBITRATION & PER-MESSAGE RESTART.

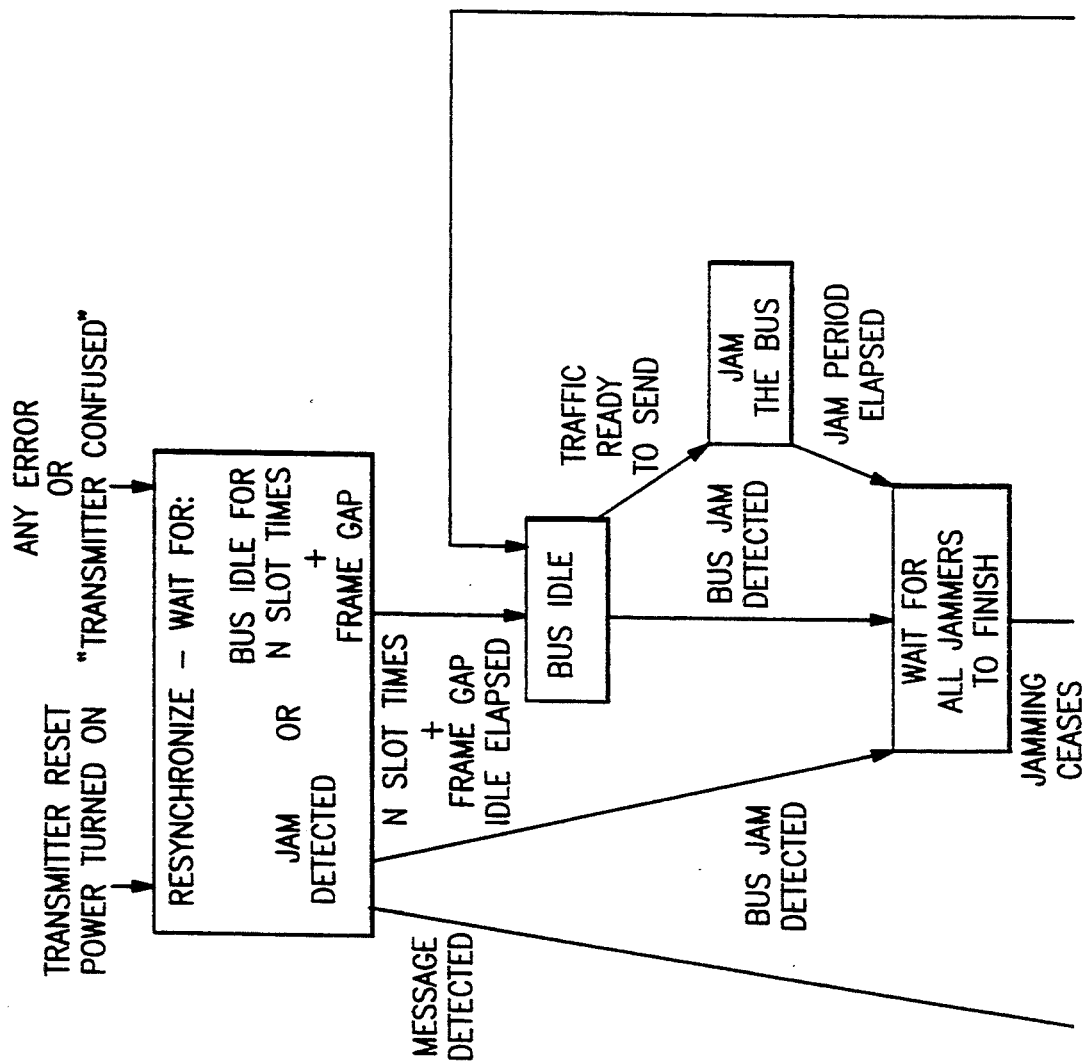

FSD FOR RCSMA PROTOCOL THAT AVOIDS PROTOCOL RESTARTS DURING HEAVY LOADS.

FSD FOR RCSMA PROTOCOL WITH BOTH FIXED PRIORITY AND ROTATING SLOTS.

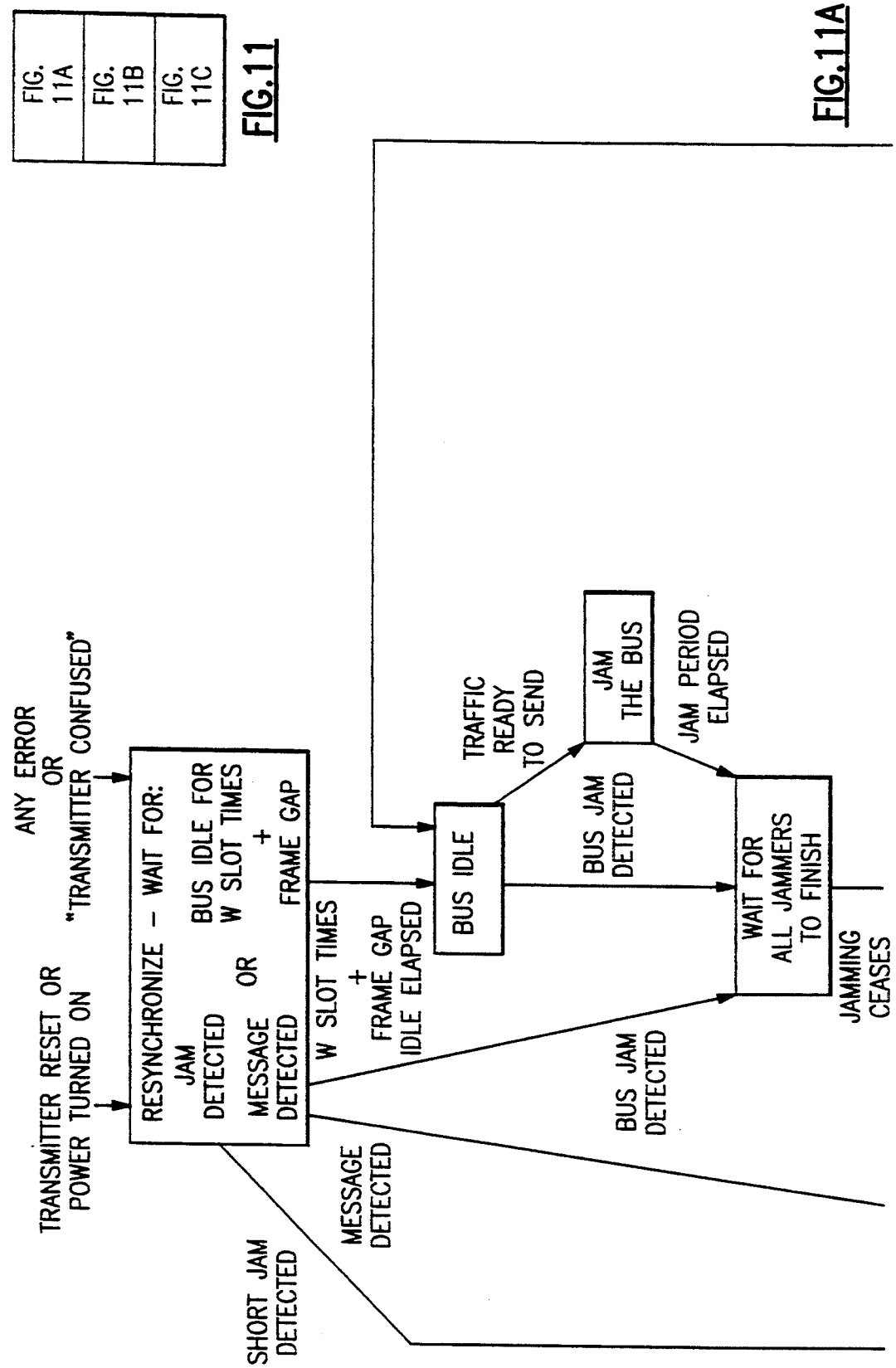

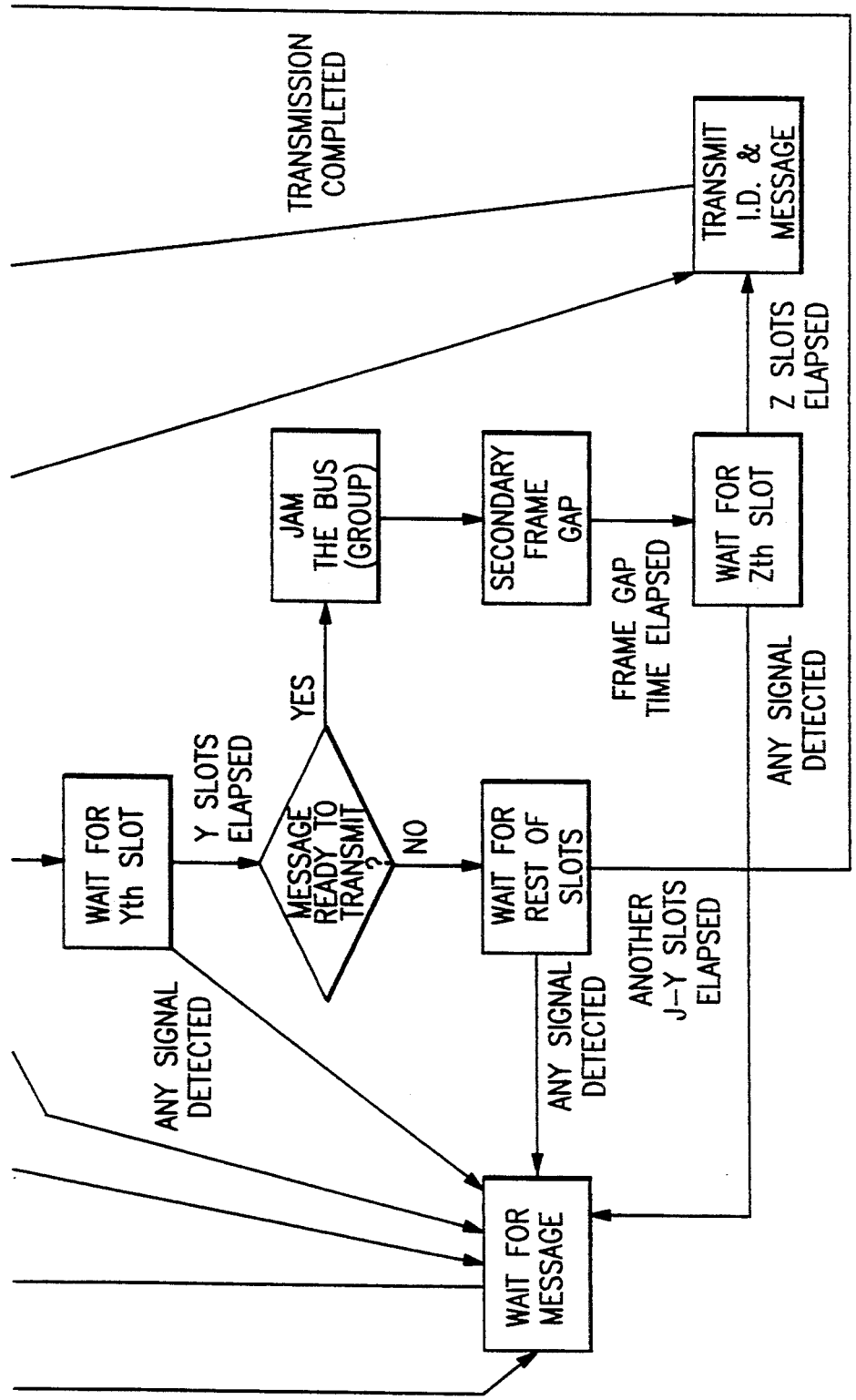

SYNCHRONOUS TIME DIVISION MULTIPLEXING USING JAM-BASED FRAME SYNCHRONIZATION

This is a File Wrapper Continuation of application Ser. No. 7/992,879, filed Dec. 21, 1992, abandoned.

TECHNICAL FIELD

This invention relates to computer communication protocols, and in particular, to a synchronous time division multiplexing media access scheme.

BACKGROUND OF THE INVENTION

If multiple transceivers attempt to use a medium simultaneously, the transmissions collide, resulting in garbled messages and potentially lost data. Media Access Control (MAC) protocols are used to arbitrate which transceiver has possession of a medium at any given time. Arbitration is the process by which one of multiple peer transceivers desiring access to the bus obtains it. The subset of MAC protocols of interest is those protocols used to implement Local Area Networks (LANs) using a shared transmission medium.

The terms "explicit token" and "implicit token" are used herein. Explicit tokens are actual messages that are passed from transceiver to transceiver as control of the medium is passed. Ownership of the token grants sole right to transmit. Token ownership is relinquished to another transceiver by sending a token message. Implicit tokens are time slots which, if used, grant exclusive access to the medium. They are implicit because no real token message exists. Rather, each time slot period of time on the communications medium carries with it the meaning of a token-to-transceiver assignment.

A. MEDIA ACCESS CONTROL PROTOCOL SELECTION

1. EXEMPLARY ELEVATOR SYSTEM

In the communication protocol selection process, a number of factors should be considered. An exemplary application to illustrate some of these factors is an elevator system which uses twisted-pair wires as a shared communications medium.

Of further interest are LANs that apply to embedded and real time control applications that require predictable and/or deterministic system response.

2. FACTORS TO BE CONSIDERED IN MEDIA ACCESS PROTOCOL SELECTION IN LIGHT OF PRIOR ART

First, collision detection circuits are impracticable in some elevator communications systems. Analog collision detection techniques rely on approximately equal signal strengths from colliding transmitted signals. However, in a large building, signals over twisted pair wires are severely attenuated over 2000 feet, so signal strengths from some transceiver pairs are very unequal.

Second, real time response requirements of elevator systems, for purposes of safety and control loop stability, require both predictable and bounded message transmission delays. In some protocols, such as CSMA/CD, there is no guarantee that any particular message will be delivered within a bounded time interval.

Third, many protocols do not allow for deterministic prioritization of network access as required by elevator control loops and safety schemes. CSMA/CD, for example, provides no guarantees for priority service.

Fourth, some protocols (e.g., CSMA/CD) make inefficient use of network bandwidth under heavy loading conditions. Existing elevator systems often have slow-speed low-grade wire that must be efficiently used to avoid the expense of installing newer, higher-speed media.

Fifth, some protocols, such as explicit-token based protocols, are vulnerable to system failures if the token is lost or duplicated and are slow to recover from such failures. Elevator control requires quick recovery from a network protocol failure in order to maintain positive control over moving machinery.

Sixth, it is desirable that broadcast messages be used in such a way as to eliminate the need for acknowledgments because multiple acknowledgment messages take up bandwidth. Therefore, lack of acknowledgment is not available as an indirect means for detecting collisions.

Seventh, elevators must be able to function in the face of failures, and so must not have the single-point failure vulnerability inherent in a central communications medium master.

Eighth, some protocols support only a limited number of transceivers. For example, implicit token protocols become inefficient as the number of implicit token time slots grows large because slot widths must account for oscillator drift. Integration of building-wide sensors and actuators (such as hall call buttons at each landing) and other building services make a capability to expand the number of transceivers to a large number highly desirable.

B. FURTHER REVIEW OF PRIOR ART

1. SYNCHRONOUS TDM PROTOCOLS

In many communications systems there is a need to occasionally resynchronize all transceivers to a common point in time. One reason synchronization is needed is that the local clock for each transceiver (usually based on a crystal oscillater or resistor/capacitor oscillator circuit) runs at a slightly different speed from local clocks at other transceivers. Factors contributing to this clock drift include component manufacturing variations, aging effects, and temperature variations.

Another reason for resynchronization is so that a newly activated transceiver (or one recovering from an error state) can join into a communication protocol currently active among other transceivers using the communication medium even in the absence of message transmissions.

Communication protocols in which the absence of continual messages implies a bus idle state can use the messages themselves as resynchronization points. However, some protocols, notably synchronous Time Division Multiplexing (synchronous TDM) protocols, are implemented such that the transceiver finite state machine is in a state other than BUS IDLE for long periods of time, even though no messages are being sent. These protocols, including synchronous TDM, usually use explicit resynchronization signals to limit the accumulated clock drift over time between different transceivers.

There is a maximum clock drift that can be tolerated while still maintaining synchronized transmission and reception within a protocol. For example, if two transceivers are to take turns transmitting based on time alone (as opposed to detection of other transmissions), a pad time must be allowed between consecutive transmissions to allow for clock drift. Accumulated clock drift must be kept smaller than this pad time for collision avoidance and, therefore, correct operation. A good way of accomplishing this is to schedule a resynchronization just before the accumulated clock drift goes out of tolerance. One way to do this is to perform resynchronization at fixed intervals (based on worst case clock drift design analysis) regardless of the protocol in use.

If the protocol is fixed-length time-slice synchronous TDM, a resynchronization is performed at the start of each transmission frame, using a frame sync signal.

Perhaps the most straightforward communication scheme is synchronous Time Division Multiplexing (synchronous TDM). In the traditional master/slave implementation, a single transceiver is designated as the bus master. This bus master queries each transceiver in turn, allowing each transceiver to transmit a message when queried. This system has high overhead because of the query messages and responses that must be generated even when the responding transceiver has no useful messages to send. This system also has the obvious reliability problem of a single master.

Still more sophisticated versions of synchronous TDM are possible. For example, a single bus master may simply transmit a frame synchronization message ("frame sync"), allowing all other transceivers to measure a unique time delay from that frame sync. Commonly, synchronous TDM protocols employ a single designated bus master transceiver to issue the frame sync signal. This has obvious limitations in terms of reliability and designation of the common bus master. Each transceiver then may transmit during its own window of time ("time slice") after the frame sync. In even more sophisticated versions, other transceivers sense whether there is activity on the bus, and cut short unused time slices.

All synchronous TDM protocols have a problem in determining which transceiver is the bus master. Either it must be predesignated, or arbitration among transceivers must be performed to designate a master at system initialization. Synchronous TDM protocols make no provision for priority messages on a global basis; the highest priority message in each transceiver's outgoing queue must wait for that transceiver's time slice.

2. EXPLICIT TOKEN PROTOCOLS

As mentioned previously, an explicit token is a message that is passed from transceiver/receiver to transceiver/receiver as control of the medium is passed. In explicit token protocols known to the art, the initial token holder is either designated as a predetermined transceiver on the network (leading to reliability problems if that predetermined transceiver becomes nonfunctional) or is determined via a potentially lengthy arbitration method involving collision detection.

3. CONTENTION-BASED AND COLLISION-AVOIDANCE PROTOCOLS

Contention-based protocols are protocols in which multiple transceivers contend for access to the communications medium asynchronously.

A simple media access protocol for LANs is Carrier Sense Multiple Access (CSMA), where "Carrier Sense" refers to the ability of a transceiver to detect data being asserted on the communication medium. When a transceiver has an outgoing message, it first performs carrier sensing to see if the medium is busy. If the medium is idle, it then transmits a message. Receipt acknowledgments are required, because there is a possibility of two transceivers beginning transmission nearly simultaneously (within a propagation delay along the communications medium, known as the vulnerable period) with a resultant collision and loss of data. This method has poor performance at high load and has poor realtime performance characteristics.

An improvement over CSMA is Carrier Sense Multiple Access with Collision Detection (CSMA/CD). When two transceivers begin transmission onto the medium within the vulnerable period a collision detection circuit is able to detect the resultant collisions, and truncate the transmission of data from both transceivers.

Collision avoidance CSMA protocols (CSMA/CA) use time slots after each collision and transmission to reduce the change of subsequent collisions.

One variation of CSMA/CA that is suited to embedded and real time control communications is Reservation Carrier Sense Multiple Access (RCSMA). RCSMA is an implicit token system in which there is a sequence of time slots after each transmitted message. In RCSMA, one time slot is assigned to each transceiver. If any transceiver has a message to send, it waits for its slot (measured as a unique time delay for each transceiver from the end of the previous message). When a transceiver's time slot is elapsing on the communications medium, the transceiver can start transmitting a message with a guarantee that it is the sole active transceiver (because of the one-to-one mapping of slots to transceivers). If a transceiver has no message to send, it remains idle and its time slot elapses, allowing the next transceiver's time slot to start. The slots are referred to as implicit tokens, because asserting data during a slot is functionally equivalent to acquiring a token for medium access. Elaborations upon RCSMA known in the art include assigning slots in different groupings to implement priority levels and implementing a "slot rotation" in which the position of slot changes based on the last transceiver active in order to implement fair access to the medium.

RCSMA schemes require either implementation of collision detection or have slow restarts from protocol errors. Also, RCSMA suffers from a limitation in the number of transceivers supported in that as the number of transceivers grows the number of implicit token slots becomes too large to be practical.

C. RESTARTING THE PROTOCOL FROM AN IDLE MEDIUM

Part of selecting a media access protocol is selecting a protocol for restarting the protocol on an idle network.

In RCSMA, implicit token slots begin to elapse at the end of a transmitted message. However, a problem arises when there is no message to be sent, allowing all slots to elapse unused. The question is, how is a new slot progression initiated in the absence of a message?. There are four strategies known to the art.

D. NETWORK RESTART

1. NETWORK RESTART WITH ARBITRATION

The NETWORK RESTART WITH ARBITRATION technique for RCSMA is taught by Kiesel and Kuehn, *IEEE Journal on Selected Areas in Communications*, Vol. SAC-1, No. 5, November 1983, pages 869–876. We shall refer to this method as the Reservation Carrier Sense Multiple Access/Collision Detection (RCSMA/CD) scheme.

If the network is idle when a transceiver acquires a message to send, the transceiver begins transmitting data immediately as in CSMA/CD. Implicit token slots begin after each message. If there is a collision, the transceivers cease transmitting, and treat the collision event as equivalent to the end of a message. Thus, a slot progression begins after a collision as if a message had just been issued. This technique addresses the problem of what to do when there is no network traffic by simply letting the medium go idle and providing for a quick restarting capability.

Collision detection is required for implementation, and this method does not overcome the practical limitation on the number of slots and therefore the number of transceivers on the network. There is a practical limit on the number of slots because beyond a certain number of transceivers, the clocks of transceivers at opposite ends of the medium may be so out of sync that they transmit in the same slot.

2. SINGLE MASTER

A SINGLE MASTER can be used to restart token flow periodically. One way this can be done is for a master to emit frame synchronization signals that start a progression of implicit token slots. If all slots have elapsed without a transmission on the communications medium, the master generates a new frame synchronization signal to start a new slot progression. By relying on a single master, there is always a source of periodic restarts (frame synchronization signals).

Problems with using a single master approach are that:

(a) the single master represents a single point of failure vulnerability within the system, (b) the master is an extra component separate from the other nodes that must be separately designed and fabricated, and (c) this method does not overcome the practical limitation on the number of slots and therefore the number of transceivers on the network.

3. ROTATING MASTER

A ROTATING MASTER is taught in "Demand Assignment Multiple Access Schemes in Broadcast Bus Local Area Network", *IEEE Transactions on Computers*, Volume C-33, No. 12, December 1984, Pages 1130–1159), by Michael Fine and Fouad Tobogi. This method prevents the bus from going idle by continually issuing dummy messages.

However, there are shortcomings in the rotating master approach that make it inappropriate for the exemplary elevator application, including the following:

(a) the rotating master still represents a subtle, single point of failure vulnerability. If the current master should fail, it will not issue a dummy message and the network will go idle; and (b) this method does not overcome the practical limitation on the number of slots and therefore the number of transceivers on the network.

4. STABLE TIME BASE

Another approach to implementing RCSMA is for the system to use stable time bases, also known as DISTRIBUTED MASTERS, to avoid the need for a central or rotating master. The DATAC system chip set from *National Semiconductor* uses this approach for a synchronous TDM implementation. In this scheme, each transceiver uses a stable time base that does not skew significantly over periods when the network goes idle (the stable time base is implemented in the DATAC chip set by having two cross-checked oscillators instead of only one). After each message, a slot progression is initiated. Whenever the slot progression is completed with no network activity, a new slot progression is automatically initiated. In other words, slot progressions repeat indefinitely without frame synchronization while the network remains idle.

The mastership is "distributed" among all transceivers. There are several problems with using this scheme for the exemplary elevator communications application:

(a) the time bases must be very stable over periods of time when the network is idle. In the DATAC application this problem is controlled by using expensive redundant oscillators;

(b) a transceiver that has lost track of the protocol state through some transient error or reset cannot immediately access the network while the network is idle, because there are no transmissions on the network to indicate where, in the time slot progression, other transceivers are located;

(c) system power-on and reset problems remain because the initial active transceiver must be chosen. DATAC uses an unspecified method of collision detection for system initialization; and (d) this method does not overcome the practical limitation on the number of slots and therefore the number of transceivers on the network.

Our new protocols are well suited to embedded real time control and avoid the key disadvantages of previous protocols: (a) single point of failure and (b) need for collision detection.

DISCLOSURE OF THE INVENTION

A first object of the present invention is a media access protocol with deterministic (i.e., repeatable), predictable, and bounded response times for routine and priority messages; highly efficient use of available communications media bandwidth; and fast initialization and recovery from transient and permanent transceiver failures without any need for collision detection or bit dominance.

A second object of the present invention is an implicit token media access protocol that supports a plurality of transceivers assigned to individual token slots without requiring collision detection. This objective is in support of multiple transceivers at the same priority level within a slot progression. A consequence of this slot-sharing capability is a significant increase in the number of transceivers which can be supported.

The present invention is predicated on the observation that some communication protocols involve collision detection by collision detection circuitry followed by transmission of a predetermined, nondestructively interfering, jam signal. This use of a jam signal enhances collision detection among a plurality of transceivers because transmission of the jam signal informs all transceivers that a collision has occurred.

The present invention is further predicated on the observation that synchronization of a plurality of transceivers is required to start a sequence of events within a communications protocol for shared medium access. One way to accomplish this is to have each transceiver desiring to initiate the sequence of events assert a message onto the communications medium. The problem with this method as currently practiced in the art is that collisions will take place if two transceivers assert such initiation messages within the "vulnerable time" (related to signal propagation delay) of the network. Said collisions corrupt data being sent and fail to establish unique ownership of the communications medium; furthermore, detecting such collisions is undesirable.

It follows from the first predicate that the present invention provides a means for synchronization of a plurality of transceivers on a shared communications medium using a "jamming" signal, thereby eliminating requirements to use collision detection or a centralized bus master. As a consequence of the second predicate, one way to use such a synchronization technique is to let the jam signal serve as a unique time point from which to start an implicit token slot progression.

According to the present invention, a collision, multiple signals transmitting onto an idle bus, is assumed and access to an idle bus begins with a jam pattern, the end of which all transceivers synchronize to.

The invention is further explained. When the communications medium is busy, implicit token slots follow the end of each message. If a slot progression completes with no messages being sent, the communication medium is allowed to go idle. According to the invention, if a transceiver has a message to send during an idle medium condition, it transmits a jam pattern onto the medium for a predetermined time (based on maximum network propagation delay). If a transceiver detects a jamming pattern, it inhibits its own transmissions and waits for the next slot progression. If multiple transceivers begin jamming within a propagation delay of each other (within the network vulnerable time), their jamming transmissions will not destructively interfere with each other. When jamming ceases, all transceivers begin a slot progression. Thus, the end of the jamming period, when all transceivers have finished jamming, serves as a network-wide synchronization signal for the start of an implicit token slot progression.

In further accord with the present invention, primary implicit token slots (that is, token slots following a message or jam used to restart network activity) are shared by multiple transceivers. When a transceiver assigned to a shared primary slot has data to transmit, it emits a jamming signal instead of a message in its token slot. This jamming signal serves as a synchronization for a second implicit token slot progression in which only transceivers sharing the primary level implicit token slot participate.

In still further accord with the present invention, a bus jam signal periodically synchronizes all transceivers in a synchronous time division multiplexing scheme.

A fundamental advantage is that all transceivers on a network can be quickly synchronized/reset to a known state without centralized control and without the use of collision detection or bit dominance. The point at which the transceivers are precisely synchronized (to within a single propagation delay) is the point at which the last jamming transceiver discontinues jamming the communications medium. While this synchronization mechanism is discussed above in terms of an implicit token protocol, it has applicability to other protocol areas, as will be demonstrated.

Some further advantages of the present invention are:

(a) small, deterministic, and bounded latency provided to prioritized messages, including prioritization at the network level (as opposed to prioritization on a per transceiver basis);

(b) bounded, deterministic fair (e.g., round-robin) access for routine (as opposed to priority) messages;

(c) highly efficient use of communications media bandwidth under heavy loads;

(d) quick restart from a failure in the protocol; and (e) larger numbers of transceivers allowed than with other implicit token systems without long slot progressions by using multi-level slot progressions.

BEST MODE FOR CARRYING OUT THE INVENTION

Co-pending applications Serial No. (Attorney Docket No. TO-1451) entitled "Implicit Token Media Access Protocol without Collision Detection" and Serial No. (Attorney Docket No. TO-1745), entitled "Implicit Token Media Access Protocol with Multi-level Bus Arbitration" are hereby incorporated by reference. An exemplary means for transmitting and receiving is shown therein.

NETWORK TOPOLOGY (FIG. 1)

The broad issue addressed by this invention is how to allocate a single communications medium among a plurality of competing transceivers.

Figure 1:
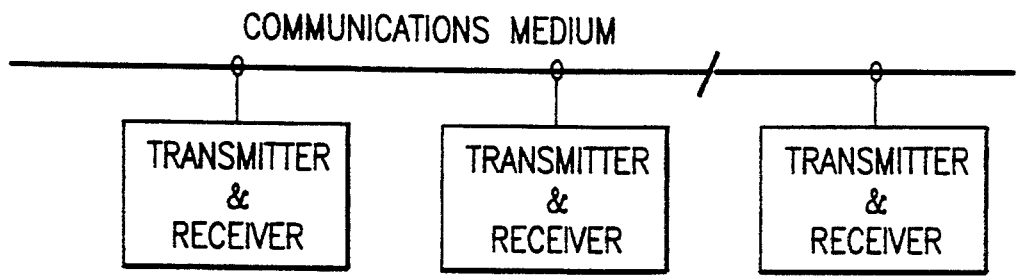
FIG. 1 is a block diagram of a plurality of transceiver/receiver nodes coupled to a shared communication medium.

FIG. 1 shows a plurality of transceiver/receiver nodes coupled onto a shared communications medium ("bus" for brevity, without loss of general applicability to all forms of shared communications media). For the purposes of the invention, each transceiver shall have available to it a receiver (either uniquely assigned or shared) to monitor protocol activity on the communications medium. The exemplary elevator communications application has one transceiver per communications node, uses a twisted pair wire, and uses a single current-mode transformer coupler for transmission and reception at each node.

GENERAL SYNCHRONIZATION (FIG. 2)

Figure 2:
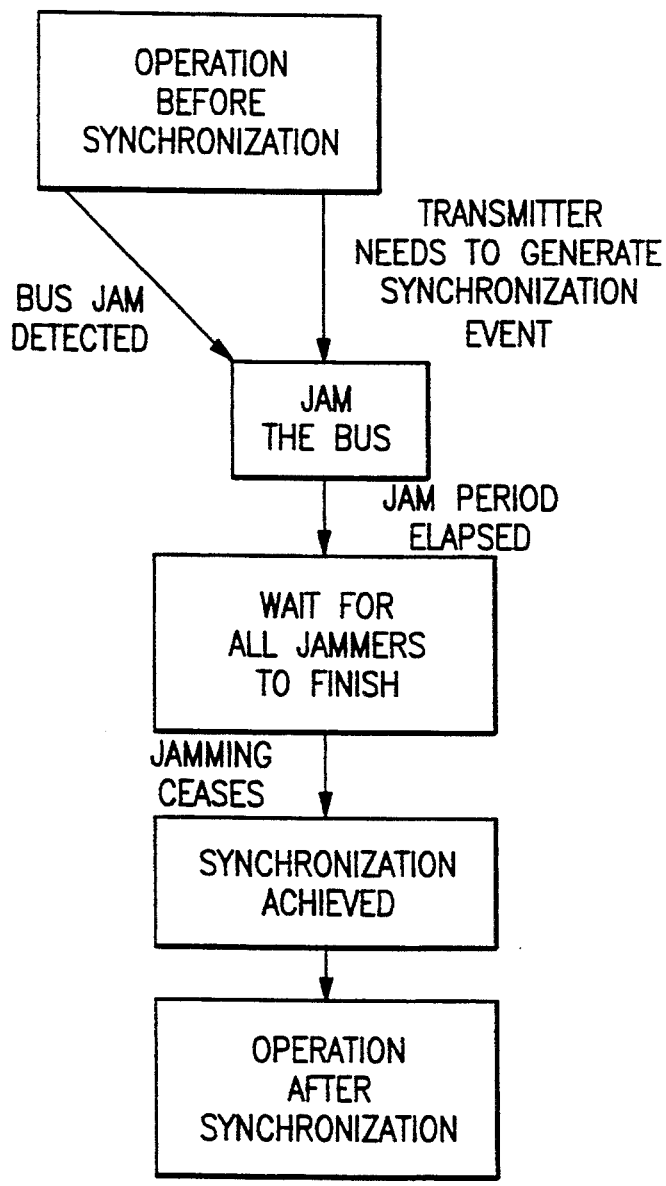
FIG. 2 is a finite state diagram for synchronizing a plurality of transceivers.

FIG. 2 is a finite state diagram (FSD) for synchronizing a plurality of transceivers coupled to a common bus. Any of the many techniques well known in the art can be used for implementing this FSD and all other FSDs discussed herein (e.g., a microcontroller-based implementation that uses a microprocessor with on-chip ROM to execute the states of the finite state diagram combined with transformer-coupling driver chips and other logic for asserting signals on twisted pair wiring). Each transceiver contains an implementation of the FSD in a finite state machine (FSM); therefore the FSD is shown from the point of view of a single transceiver.

Briefly, the FSD of FIG. 2 operates by having a subset of transceivers broadcast a jamming signal that is received by all receivers, then having all transceivers wait for the end of the last-started jamming transmission to achieve synchronization. It is sometimes the case that jamming by a subset of all transceivers, rather than one or all, will occur depending on the situation.

The importance of the mechanism described by FIG. 2 is that it is able to synchronize all transceivers on a shared communications medium to within one propagation delay. The transceivers are synchronized when they all transition from WAIT FOR ALL JAMMERS TO FINISH. This synchronization occurs very quickly (at the end of a two propagation delay jamming period), and can be initiated by a plurality of transceivers without need for collision detection.

OPERATION BEFORE SYNCHRONIZATION

The transceiver starts in the OPERATION BEFORE SYNCHRONIZATION state. In this state, the transceiver is performing whatever operations it would normally perform before the requirement for synchronization with other transceivers arises. The transceiver transitions to JAMTHE BUS if the transceiver needs to establish a synchronization with other transceivers for any reason. If a bus jam (discussed later) is detected, the transceiver transitions to WAIT FOR ALL JAMMERS TO FINISH.

More than one transceiver can transition from OPERATION BEFORE SYNCHRONIZATION to JAM THE BUS. This possibility arises because there is a finite signal propagation delay along the communications medium. If a transceiver begins jamming the bus, all other transceivers transition to WAIT FOR ALL JAMMERS TO FINISH when they receive the jam signal. However, if a transceiver begins jamming, it is possible for any other transceiver to transition to JAM THE BUS in the interval between the time the jamming was started and the time that the jamming signal reaches the receivers of potential additional jammers. This time interval during which multiple jammers can become active is known as the "vulnerable period", and is equal to the maximum signal propagation delay between any transceiver and any receiver along the communications medium (assuming that processing time at the receiver is negligible). It is impossible for a transceiver to begin jamming later than the expiration of the vulnerable period because all transceivers will have detected the jamming signal and transitioned from OPERATION BEFORE SYNCHRONIZATION to WAIT FOR ALL JAMMERS TO FINISH.

JAM THE BUS

Once a transceiver has transitioned from OPERATION BEFORE SYNCHRONIZATION to JAM THE BUS the transceiver begins asserting a jam signal on the bus for a predetermined time. Here the jamming signal is a predetermined continuous voltage level (e.g., a logical ON state). Note that this jamming signal has the property that destructive waveform superposition cannot take place, as well as the property that the signal will be recognized when one as well as more than one transceiver simultaneously asserts it; e.g., that all transceivers have jam signals of the same polarity. Here the jamming period lasts more than two propagation delays in duration. This is to guarantee that potential signals from all jamming transceivers (which may be skewed from each other in starting time by up to one propagation delay) have time to reach all receivers (requiring a second propagation delay) before any jammers cease jamming. This minimum jamming period ensures that the jamming will be received as a continuous signal from start to end at all receivers without gaps caused by skewed jamming starting times.

WAIT FOR ALL JAMMERS TO FINISH

When a transceiver's jamming time period has elapsed, the transceiver transitions from JAMTHE BUS to WAIT FOR ALL JAMMERS TO FINISH. Because there are a plurality of simultaneous jammers possible, it may be that a transceiver is not the only jammer. Therefore, all transceivers wait for their respective receivers to detect the end of the collective jamming signal (whether their own transceiver was previously jamming or not) in the WAIT FOR ALL JAMMERS TO FINISH state. When the end of jamming is detected, all transceivers transition from WAIT FOR ALL JAMMERS TO FINISH to SYNCHRONIZATION ACHIEVED.

SYNCHRONIZATION ACHIEVED

When each transceiver transitions to the SYNCHRONIZATION ACHIEVED state, it is guaranteed to have reached that state within one bus propagation delay of all other transceivers (because of the propagation delay of the end of the jamming signal from the last-active jamming transceiver to all other transceivers).

OPERATION AFTER SYNCHRONIZATION

After the synchronization is noted by the transceiver, control passes on to some other implementation-specific activities in the OPERATION AFTER SYNCHRONIZATION state.

Advantages of this protocol of FIG. 2 over other synchronization methods are:

(1) Synchronization is achieved without ever designating any component(s) as a "master";

(2) Synchronization is achieved without arbitration; and (3) Synchronization is achieved without collision detection, even though a plurality of transceivers can be generating the synchronization event in parallel.

SYNCHRONOUS TIME DIVISION MULTIPLEXING (FIG. 3)

Figure 3:
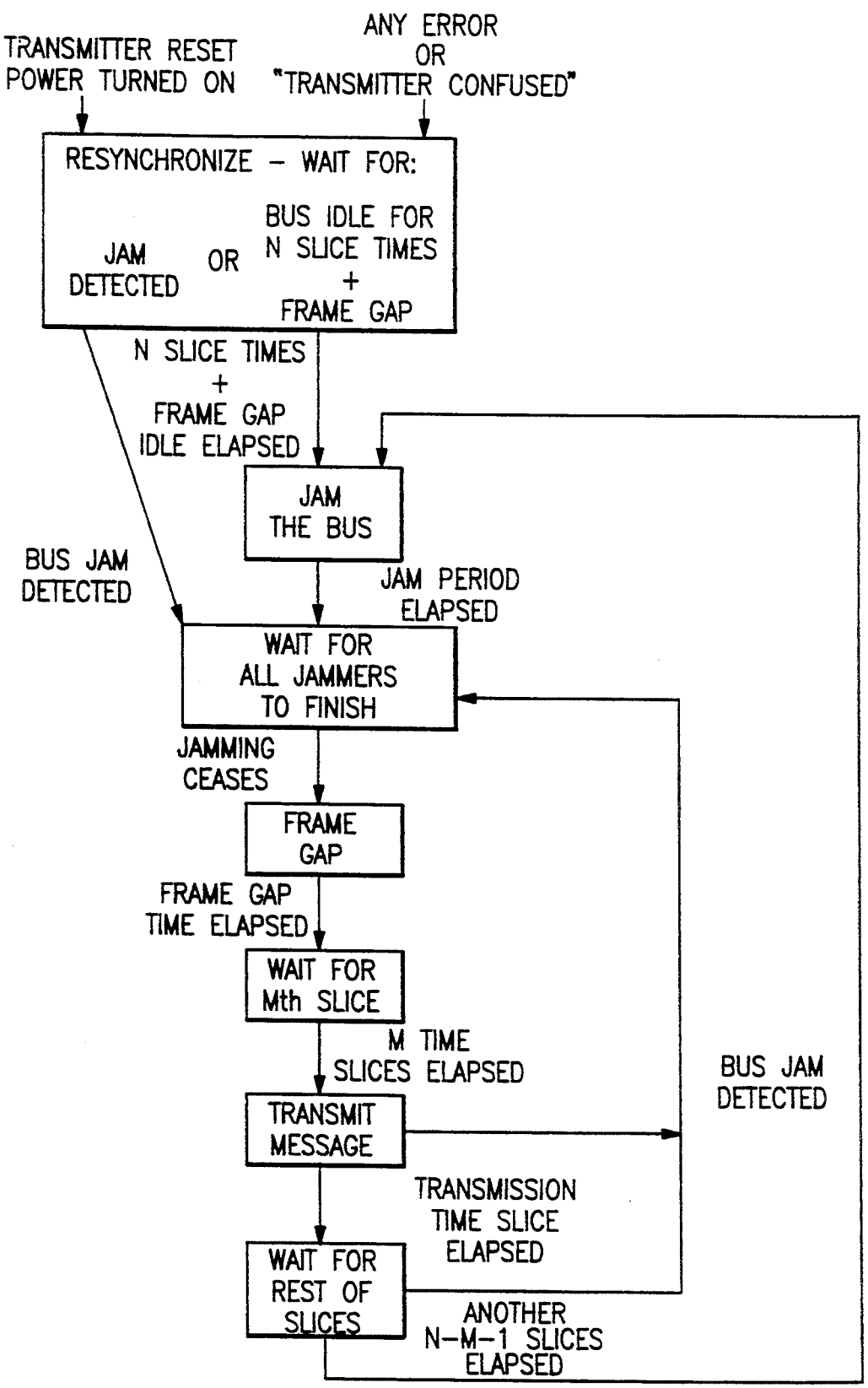
FIG. 3 is a finite state diagram for implementing operation of a synchronous Time Division Multiplexing (TDM) protocol without a central bus master.

FIG. 3 is a finite state diagram (FSD) for implementing a distributed synchronous Time Division Multiplexing (synchronous TDM) protocol. In a synchronous TDM protocol, all transceivers are uniquely assigned a time slice in a "frame". Each transceiver can send messages during, and only during, its uniquely assigned time slice.

Time slices are different from time slots. A time slice is an allocated time for transmission of a message which expires on the bus, whether used by a transceiver or not used. A time slot is necessarily only long enough to indicate whether a transceiver is using an implicit token and therefore does not need to be big enough to send a message; a time slot is usually about twice a propagation delay time.

Time slice starting and ending times are measured with respect to a predetermined frame starting signal. Because different transceivers may have slightly different clock frequencies, a new frame signal is used at the beginning of each frame to keep all transceivers synchronized to a common time base.

In the protocol of FIG. 3, a bus jamming signal is used by a plurality of transceivers as a frame starting signal without arbitrating for a single bus master. The bus jam signal is provided onto the bus as a function of a known resynchronization time stored in a transceiver. For example, the bus jam signal may be provided periodically and the resynchronization time is the time required for all transceivers to transmit messages. This is accomplished by extending the method shown in FIG. 2 to accomplish the synchronization.

The following notation applies to FIG. 3: There are N transceivers coupled to the bus (not all of which need be operational or active). There are N time slices in each frame. N is the number of transceivers on the bus.

Each transceiver is assigned a unique number M, between 0 and N-1 inclusive, corresponding to its unique transceiver ID number. Transceiver M is assigned the Mth time slice (with the first time slice being slice number 0) within each synchronous TDM frame.

RESYNCHRONIZE

The RESYNCHRONIZE state corresponds to the OPERATION BEFORE SYNCHRONIZATION state of FIG. 2.

The RESYNCHRONIZE state is reached by resetting the FSM, for example by turning the power on. This state is also reached whenever the FSM implementation detects an illegal state, unexpected signal, or other error condition. When a transceiver first reaches the RESYNCHRONIZE state, it must first determine whether other transceivers are active on the bus. It does this by waiting a period of idle time (i.e., a time during which no other transceiver asserts a signal of any kind on the bus) equal to the longest time between frame start signals (i.e., bus jams). This time is equal to the total time for all time slices in the system plus the frame gap time plus one propagation delay. If no bus jams are detected in this interval, all other transceivers must be either somehow disabled (e.g., power turned off) or also in the RESYNCHRONIZE state, so the transceiver transitions to the JAM THE BUS state to initiate a new frame.

If a bus jam is detected while in the RESYNCHRONIZE state, the transceiver transitions to WAIT FOR ALL JAMMERS TO FINISH.

JAM THE BUS

This state is identical to that of FIG. 2.

WAIT FOR ALL JAMMERS TO FINISH

This state is identical to that of FIG. 2.

FRAME GAP

After jamming ceases, all transceivers allow a frame gap period to elapse. This is a short period required by some bus coupling technologies (e.g., current-mode transformer coupling) to discharge energy accumulated during the transmission process from the bus coupling device. Using other transmission implementations a zero-length frame gap may be acceptable.

WAIT FOR Mth SLICE

After the frame gap, each transceiver is permitted to transmit during its dedicated time slice. Each transceiver waits for the Mth time slice to begin (where M is the unique transceiver number from 0 to N-1). When M time slice times have passed, the transceiver transitions to TRANSMIT MESSAGE.

TRANSMIT MESSAGE

Once the Mth time slice has started, the transceiver can begin transmitting a plurality of messages. Here each transceiver ceases transmitting before its time slice ends by an amount we shall refer to as the pad time. Leaving a pad time at the end of the time slice accommodates a certain amount of skew (caused by the synchronization propagation delay) and drift (caused by non-uniform time sources) between different transceivers to avoid collisions and allows a gap after transmission to discharge energy from the active transceiver in the manner discussed for FRAME GAP. Here the pad time is the sum of two bus propagation delays plus a frame gap plus the worst case clock drift over the length of a round-robin transmission frame.

If the transceiver has no messages to transmit, it remains idle but in the TRANSMIT MESSAGE state for the duration of its time slice. If it has messages shorter than the duration of its time slice, it transmits them and then remains in the TRANSMIT MESSAGE state until the end of the time slice.

If the time base of the FSM under discussion is sufficiently slower than other time bases and the FSM is assigned to the last time slot, the FSM will detect a bus jam while still in the TRANSMIT MESSAGE state (during the pad time, not during an active transmission). When this happens, the FSM transitions to WAIT FOR ALL JAMMERS TO FINISH in order to resynchronize with other transceivers.

WAIT FOR REST OF SLICES

After the transceiver's time slice is over, the FSD transitions into WAIT FOR REST OF SLICES. In this state, it waits for an additional N-M-1 time slices to elapse. At the end of this time, all N time slices will have elapsed, it will be time for a new frame synchronization, and therefore the transceiver transitions to JAM THE BUS.

If the time base of the transceiver under discussion is sufficiently slower than other time bases, the transceiver will detect a bus jam while still in the JAM THE BUS state. When this happens, the transceiver transitions to WAIT FOR ALL JAMMERS TO FINISH in order to resynchronize with other transmitters. In a properly designed system, there will be enough idle time at the end of each slice so that the highest numbered transceiver (number N-1) is done with its actual transmission before any transceiver transitions to JAM THE BUS (taking into account worst-case timing drift and skew). Thus, the idle time for each slice is a design parameter that should be adjusted to accommodate time base stability specifications in the implementation.

It will be obvious to one skilled in the art that each transmitter can be assigned more than one time slice to perform load balancing.

For example, a single transmitter could be assigned two time slices if it had twice as many messages to transmit, on average, than other transmitters.

Also, it will be obvious to one skilled in the art that time slice compression can be used (as in the DATAC protocol referenced previously). With this scheme, if a time slice goes unused for a predetermined period of time shorter than the entire time slice, all transceivers automatically progress to the next time slice without any signaling taking place. In this case, the frame signal will occur at a varying time period, but still at the start of each new frame, the varying time period, depending on how many actual messages were transmitted. The synchronization could even be skipped for one or more time slice rotations in accordance with predetermined rules (based upon expectations of a worst-case clock drift).

Advantages of this protocol of FIG. 3 over other synchronous TDM protocols are:

(1) There is no need to select a bus master of any kind;
(2) Accumulated timing drift and skew is reduced to one bus propagation delay at the beginning of each frame;

BUS MASTER ARBITRATION (FIG. 4)

Figure 4:
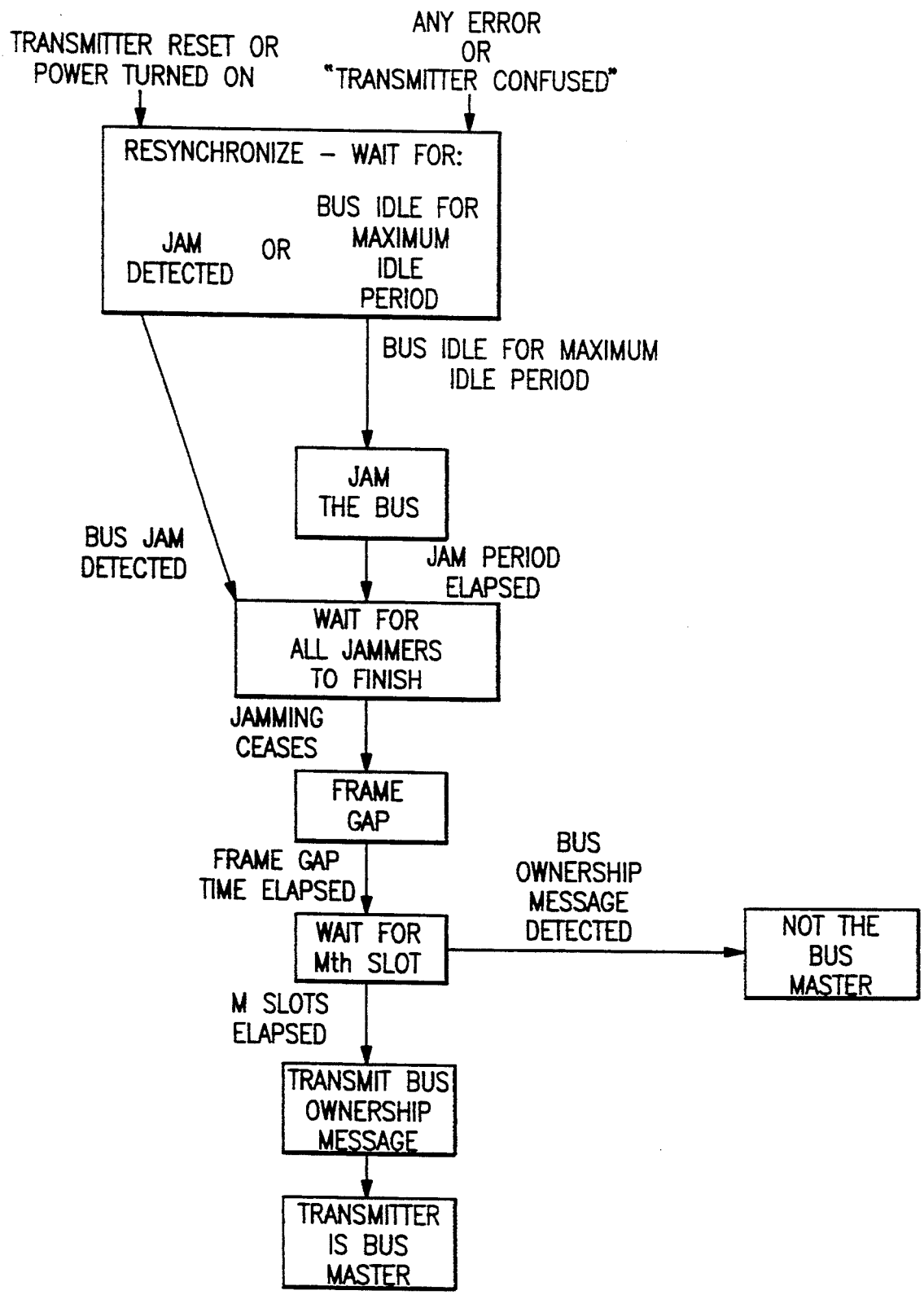
FIG. 4 is a finite state diagram for implementing bus master arbitration.

FIG. 4 is a finite state diagram for bus master arbitration. Each transceiver contains an implementation of the FSD; therefore the FSD is from the point of view of a single transceiver.

The importance of the mechanism described by FIG. 4 is that it uses the synchronization capability of FIG. 2 to arbitrate a unique owner of a shared bus without a predetermined bus master, collision detection, or bit dominance. This occurs at the FRAME GAP state following the state WAIT FOR ALL JAMMERS TO FINISH since the end of the last jamming signal is the synchronizing event. This synchronization is followed by an implicit token slot progression in which each slot is of duration proportional to the number of transceivers being arbitrated among.

The following notation applies to FIG. 4:

There are N transceivers coupled to the bus (not all of which need be operational or active). There are N implicit token slots used for arbitration.

Each transceiver is assigned a unique number M, between 0 and N-1 inclusive, corresponding to its unique transceiver ID number. Transceiver M is assigned the Mth token slot position, with token slot 0 being the first token slot in the progression.

RESYNCHRONIZE

The RESYNCHRONIZE state corresponds to the RESYNCHRONIZE state of FIG. 3. The only difference is that the Maximum Idle Period is predetermined by the implementation protocol being used with the bus master arbitration method, and is not necessarily simply the number of TDM time slices plus frame gap.

JAM THE BUS

This state is identical to that in FIG. 3.

WAIT FOR ALL JAMMERS TO FINISH

This state is identical to that in FIG. 3.

FRAME GAP

This state is identical to that in FIG. 3.

WAIT FOR Mth SLOT

After the frame gap, each transceiver waits for its implicit token time slot. When the Mth implicit token slot begins (where M is the unique transceiver number from 0 to N-1), the transceiver transitions to TRANSMIT BUS OWNERSHIP MESSAGE. If the transceiver detects a bus ownership message from some other transceiver, the transceiver transitions to NOT THE BUS MASTER.

NOT THE BUS MASTER

If the FSD reaches the NOT THE BUS MASTER state, some other transceiver has acquired bus mastership before the current FSM's implicit token slot became available. This FSD therefore does not own the bus.

TRANSMIT BUS OWNERSHIP MESSAGE

If the FSM reaches the TRANSMIT BUS OWNERSHIP MESSAGE state, it is the first transceiver to recognize the availability of an implicit token slot (either because its value of M is 0, or because lower-numbered values of M are non-functional or not installed in the communications network). This FSM therefore transmits some predetermined bus ownership message to broadcast to all other nodes that it owns the bus. When the transmission is completed, the FSM transitions to TRANSCEIVER IS BUS MASTER.

TRANSCEIVER IS BUS MASTER

If the FSD reaches the TRANSCEIVER IS BUS MASTER state, its associate transceiver is the bus master, and can begin transmitting without danger of collision from other transceivers.

Advantages of this arbitration method of FIG. 4 over other methods of bus master arbitration are:

(1) A bus master is selected among all active transceivers with no predetermined initial bus master;
(2) Bus master arbitration follows a predetermined prioritization;
(3) Bus master arbitration occurs in a deterministic time period-a function of the slot time and number of slots; and
(4) Bus master selection is accomplished without collisions.

EXPLICIT TOKEN BUS PROTOCOL (FIG. 5)

Figure 5:
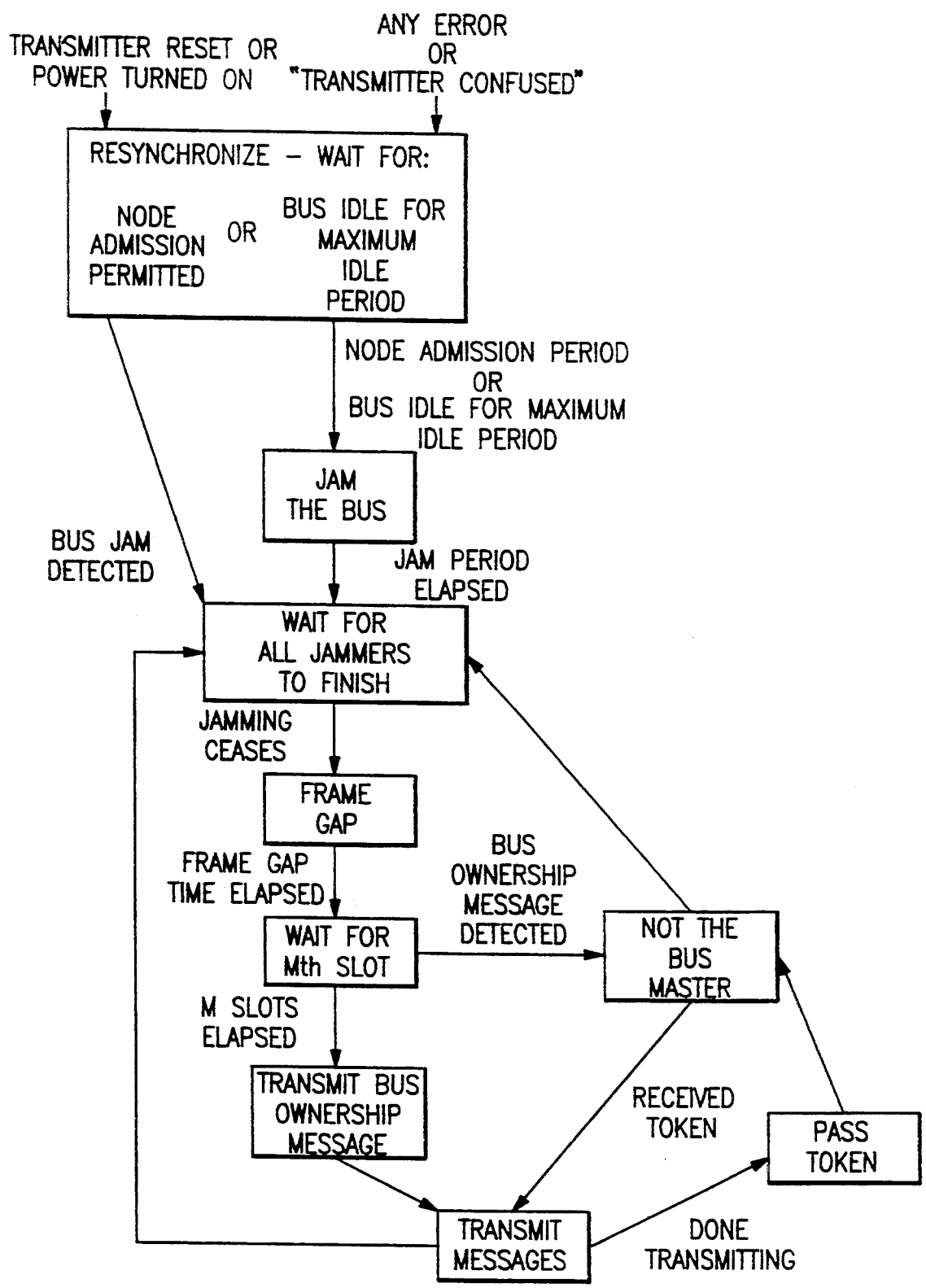
FIG. 5 is a finite state diagram for implementing an Explicit Token Bus protocol with initial bus master arbitration.

FIG. 5 is a finite state diagram for implementing an Explicit Token Bus protocol with initial bus master arbitration. Unlike the finite state diagram of FIG. 4, which is for an implicit token protocol and therefore requires arbitration of a bus master each time an idle bus is accessed, the FSD of FIG. 5 requires bus master arbitration only on start-up; after that time, the bus master is known as the owner of the explicit token. Each transceiver contains an implementation of the FSD depicted by the FSD of FIG. 5; therefore the FSD is from the point of view of a single transceiver.

The importance of the FSM described by the FSD of FIG. 5 is that it uses the synchronization capability of the FSM of FIG. 4 to implement an explicit token bus protocol with fast (since there is no collision detection) arbitration of a unique initial token holder without need for collision detection nor a predetermined initial token holder. The transceivers are synchronized when leaving the state WAIT FOR ALL JAMMERS TO FINISH since the end of the last jamming signal is the synchronizing event.

The notation of FIG. 4 applies to FIG. 5.

Each transceiver has a locally maintained variable called NEXT ID that stores the next transceiver ID value (after the current FSD) in the token passing sequence.

RESYNCHRONIZE

The RESYNCHRONIZE state corresponds to the RESYNCHRONIZE state of FIG. 4. The only difference is that the explicit token protocol provides a brief time, a Node Admission period after every message during which a jam can be asserted to allow a newly reset transceiver to gain admission to the token passing sequence. The Node Admission period is shorter than the MAXIMUM IDLE PERIOD and is proportional to one slot time.

JAM THE BUS

This state is identical to the corresponding state of FIG. 4.

WAIT FOR ALL JAMMERS TO FINISH

This state is identical to the corresponding state of FIG. 4.

FRAME GAP

This state is identical to the corresponding state of FIG. 4.

WAIT FOR Mth SLOT

This state is identical to the corresponding state of FIG. 4.

NOT THE BUS MASTER

This state corresponds to the NOT THE BUS MASTER state of FIG. 4. In this state the transceiver waits to receive an explicit token passed to it from another transceiver before transitioning to TRANSMIT MESSAGES if a bus ownership message is received by the transceiver.

TRANSMIT BUS OWNERSHIP MESSAGE

This state is identical to the corresponding state of FIG. 4, except that once the message is transmitted, the FSD transitions to TRANSMIT MESSAGES.

TRANSMIT MESSAGES

Once the transceiver has established that it owns the bus (either from the TRANSMIT BUS OWNERSHIP MESSAGE state or receiving a token), it begins transmitting messages. When the transceiver has completed transmission, it transitions to PASS TOKEN.

PASS TOKEN

Once the transceiver is ready to relinquish control of the bus, it transmits an explicit token passing message to the next transceiver in the explicit token rotation. Here determination of the next transceiver is performed as follows.

The transceiver sends a message to a transceiver designated by the local value of NEXT_ID (initially set to M+1 (modulo N)). If a reply is received, it transitions to NOT THE BUS MASTER. If no reply is received after a predetermined reply time limit, it increments the next transceiver number (modulo N) and tries again. This incrementing is repeated until a reply is received. Once a reply is received, the number of the replier is stored in memory as the new local value of NEXT_ID.

Advantages of this protocol of FIG. 5 over other explicit protocol methods are those of FIG. 4 plus any transceiver can gain admittance to the network protocol by asserting a jam signal during an appropriate time, causing reconfiguration of the network.

RESERVATION CSMA PROTOCOL (FIG. 6)

Figure 6:
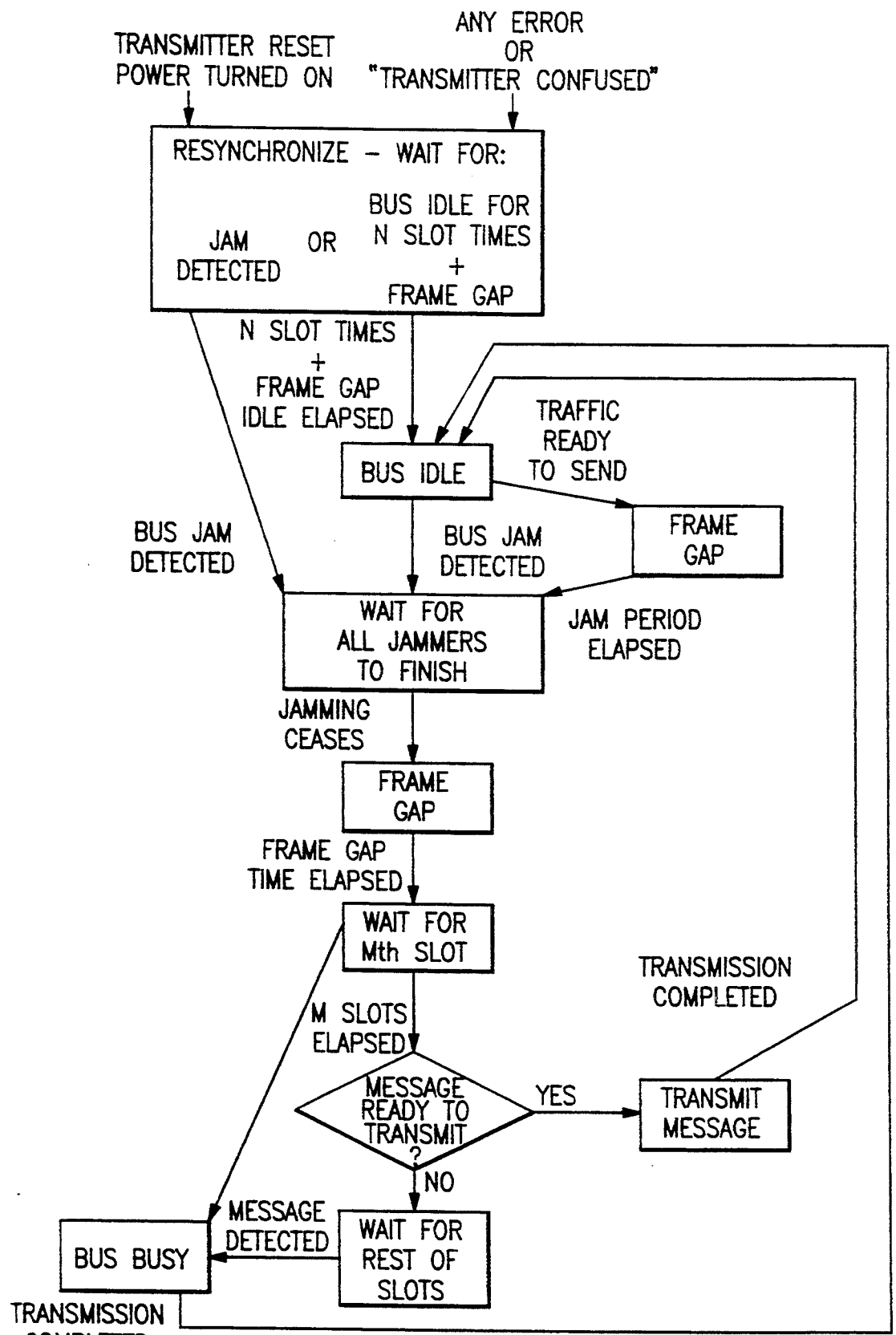
FIG. 6 is a finite state diagram for a Reservation CSMA implicit token media access protocol with fixed priorities that idles the bus after each transmission.

FIG. 6 is an FSD for a Reservation CSMA implicit token media access protocol with fixed priorities that idles the bus after each transmission. Each transceiver contains an implementation of the FSD; therefore the FSD is from the point of view of a single transceiver.

In other RCSMA protocols known to the art, either (a) the BUS IDLE state is an error situation requiring a system restart initiated by some central master (i.e., BUS IDLE state is avoided in normal operation), or (b) collision detection circuitry is required to correctly handle the case of multiple transceivers accessing the bus within the vulnerable period during the BUS IDLE state.

The importance of the mechanism described by FIG. 6 is that it uses the synchronization capability of FIG. 4 to implement an RCSMA bus protocol without need for collision detection or a way of keeping slot progressions active to avoid the BUS IDLE state by restarting the jam and slot progression sequence for each message. This is called permessage restart. The transceivers are synchronized when leaving the state WAIT FOR ALL JAMMERS TO FINISH since the last jamming signal is the synchronizing event.

The FSD as shown implements fixed-priority transmission by assigning one transceiver to each implicit token slot. It should be apparent to a skilled practitioner that slots can also be assigned by message type or any other criteria, as long as the system-level operation assures no two transceivers can be assigned the same slot simultaneously.

The notation of FIG. 4 applies to FIG. 6.

RESYNCHRONIZE

The RESYNCHRONIZE state corresponds to the RESYNCHRONIZE state of FIG. 4. The only difference is that the Maximum Idle Period is more specifically designated a "N Slot times Frame Gap", which is the maximum time period for which there can be no transmissions onto the bus in non-BUS IDLE states. If the bus has been idle for this long, the FSM transitions to BUS IDLE, and waits for some transceiver to have a message to transmit.

BUS IDLE

When there are no messages to be sent, the FSD remains in the BUS IDLE state. If the FSM has a message to transmit, it transitions to JAM THE BUS. If it detects a bus jam, it transitions to WAIT FOR ALL JAMMERS TO FINISH.

JAM THE BUS

This state is identical to that of FIG. 4.

WAIT FOR ALL JAMMERS TO FINISH

This state is identical to that of FIG. 4.

FRAME GAP

This state is identical to that of FIG. 4.

WAIT FOR Mth SLOT

This state is identical to that of FIG. 4.

MESSAGE READY TO TRANSMIT?

This is a no-delay decision state during which the FSD checks its transmission buffer to determine if there are any messages waiting to be transmitted. If there are, the FSD transitions to TRANSMIT MESSAGE. Otherwise, the FSD transitions to WAIT FOR REST OF SLOTS.

TRANSMIT MESSAGE

Upon entering this state, the FSD acquires the bus by transmitting a message. This bus activity implicitly notifies all other transceiver FSDs on the bus that the implicit token has been taken, causing them to transition to BUS BUSY. When the transmission is completed, the FSD transitions to BUS IDLE.

WAIT FOR REST OF SLOTS

In this state the FSD waits for the rest of the implicit token slots to elapse. Upon detection of a message, the FSD transitions to BUS BUSY. With the transceiver in proper operation, no more than N-M slots will elapse while in this state.

BUS BUSY

The FSM enters this state when some other transceiver has acquired the bus and is transmitting. The FSM in a BUS BUSY state monitors the bus for the end of the transmission, then transitions to BUS IDLE.

Advantages of this protocol of FIG. 6 over other implicit protocol methods are those of FIG. 4.

(1) Bus master arbitration (using an implicit token method) is used to choose which transceiver can transmit the next message on the bus; and (2) The transceiver allowed to transmit is re-arbitrated every message, allowing transparent entry and exit of individual transceivers to the protocol and guaranteeing that the highest priority transmission available in the system will be sent at each arbitration.

MULTI-LEVEL BUS MASTER ARBITRATION (FIG. 7)

Figure 7A:
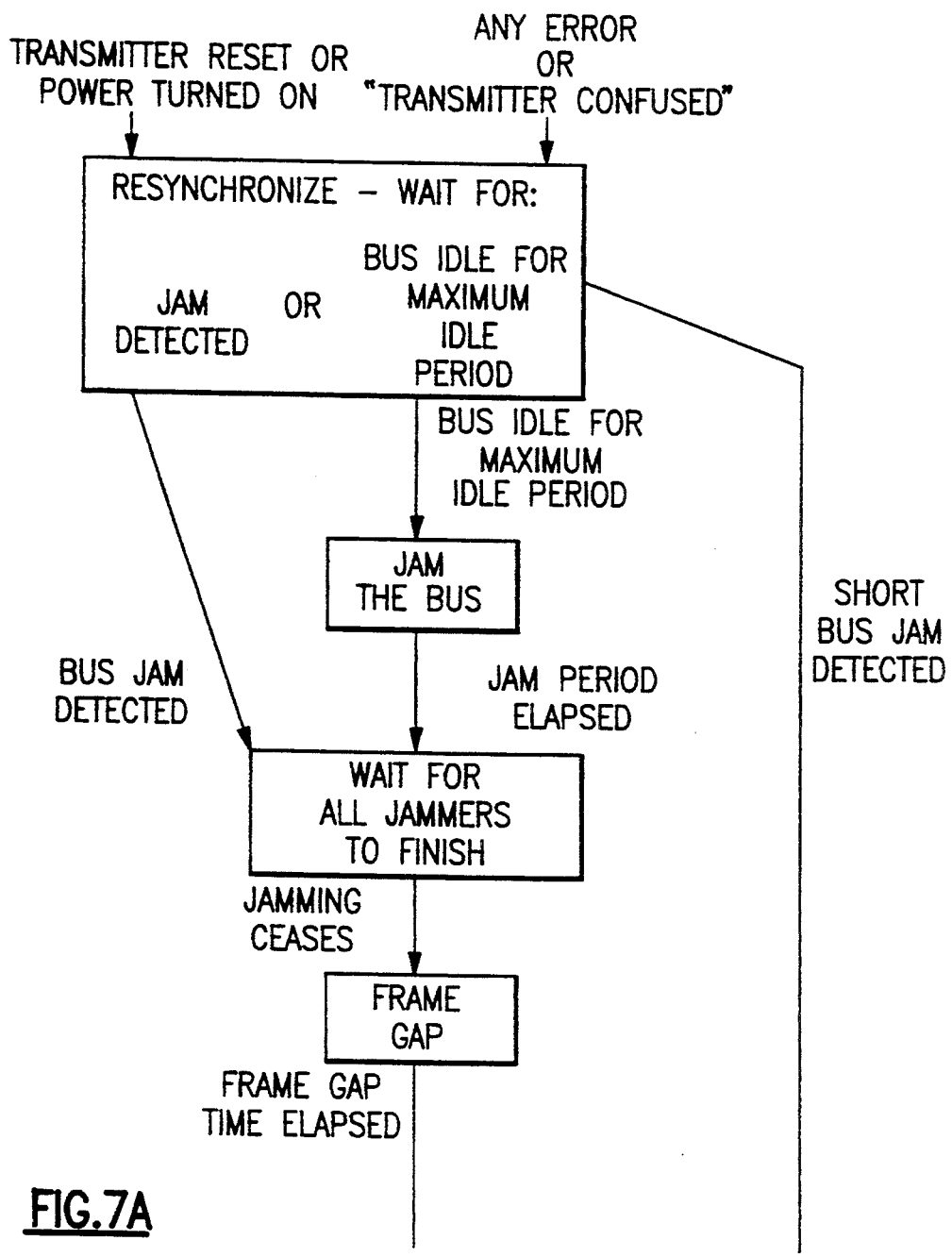
FIG. 7 is a finite state diagram for implementing multi-level bus master arbitration.
Figures 7, 7B:
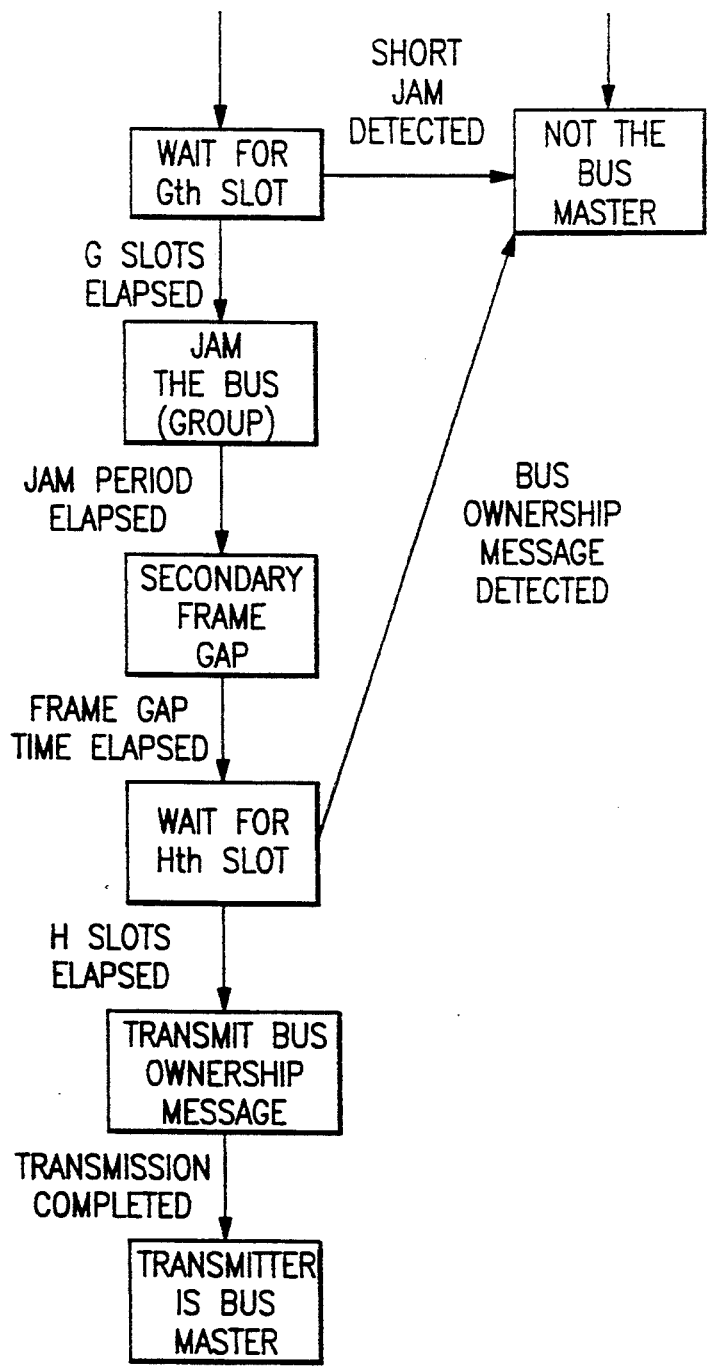

FIG. 7 is an FSD for implementing multi-level bus master arbitration. Each transceiver contains an implementation of the FSD; therefore the FSD is from the point of view of a single transceiver.

The mechanism described by FIG. 7 extends the bus master arbitration capability of FIG. 4 to include "multi-level arbitration." A general description of this capability is as follows. Within the initial implicit token slot progression after synchronization (i.e., after a primary jam), a plurality of transceivers are assigned to each implicit token slot (primary slots). All transceivers that attempt to acquire a particular implicit token primary slot do so by asserting a secondary jamming signal instead of sending a message. This secondary jamming signal initiates a new implicit token slot progression (implicit token secondary slots) in which each transceiver from those assigned to a common implicit token primary slot is uniquely assigned an implicit token secondary slot. To claim its unique secondary slot, the transceiver sends a bus ownership message. The transceivers are synchronized when leaving the state WAIT FOR ALL JAMMERS TO FINISH since the end of the last jamming signal is the synchronizing event.

The importance of this protocol is that a large number of transceivers can be accommodated in a relatively small amount of slot time on the bus. This is accomplished by having a set of primary implicit token slots arbitrate among groups of transceivers and secondary implicit token slots arbitrate among individual transceivers within a group.

This synchronization occurs using a token slot mechanism of duration proportional to the square root of the number of transceivers being arbitrated among (assuming roughly equal distribution of transceivers among groups). For example, where there are 25 transceivers to be arbitrated among and there are five groups of five transceivers, the slot time is proportional to five. It will be apparent to a skilled practitioner of the art that slots can also be assigned by message type or any other criteria, as long as the system-level operation assures that no two transceivers can be assigned the same combination of primary and secondary slots simultaneously. It will also be apparent to a skilled practitioner of the art that the multi-level arbitration scheme can be extended to more than two levels of slot progression.

The following notation applies to FIG. 7:

There are N transceivers coupled to the bus (not all of which need be operational or active).

Each transceiver is assigned a group number G (primary slot) and a subgroup number H (secondary slot). G and H are assigned with 0 as the smallest value. Each G/H combination is unique to a transceiver within the system. While assignments may be arbitrarily made, here each group G has an approximately equal number of transceivers.

RESYNCHRONIZE

This state is identical to the corresponding state of FIG. 4. Additionally, if a "short bus jam" (described later) is detected, the FSD transitions directly to NOT THE BUS MASTER because the FSD has attempted resynchronization after the primary slot progression has commenced.

JAM THE BUS

This state is the same as that in FIG. 4.

WAIT FOR ALL JAMMERS TO FINISH

This state is the same as that in FIG. 4.

FRAME GAP

This state is the same as that in FIG. 4.

WAIT FOR Gth SLOT

After the frame gap, each transceiver waits for the implicit token time slot of its assigned group G. When the Gth implicit token slot begins, the transceiver transitions to JAM THE BUS (GROUP). If the FSD detects a jam from some other transceiver, the FSD transitions to NOT THE BUS MASTER.

NOT THE BUS MASTER

This state is the same as that in FIG. 4.

JAM THE BUS ( GROUP )

This state is similar in function to the JAM THE BUS state. However, the length of the jamming signal can be shorter than for the JAM THE BUS state. Because it is necessary only to have all receivers register the existence of a non-interfering signal, not synchronize up on it. This jam shall be referred to as a "short jam", even though it need not be actually shorter than the other jam (however, here it is of a sufficiently different duration——longer or shorter——to distinguish it from the other jamming signal). Because all transceivers are already synchronized, a separate state corresponding to WAIT FOR ALL JAMMERS TO FINISH is not required.

SECONDARY FRAME GAP

This state is identical to the FRAME GAP state.

WAIT FOR Hth SLOT

This state is similar in function to the WAIT FOR Gth SLOT state. However, the Hth slot is unique to all transceivers within the currently active group G. When the Hth implicit token slot begins the transceiver transitions to TRANSMIT BUS OWNERSHIP MESSAGE. If the FSD detects a bus ownership message from some other transceiver, the FSD transitions to NOT THE BUS MASTER.

TRANSMIT BUS OWNERSHIP MESSAGE

If the FSM reaches the TRANSMIT BUS OWNERSHIP MESSAGE state, it is the first transceiver to recognize the availability of an implicit token slot within the group G (either because its value of H is 0, or because lower-numbered values of H are non-functional or not installed in the communications network). This FSM therefore transmits a bus ownership message to broadcast to all other nodes that it owns the bus. The bus ownership message indicates ownership of the bus and does not necessarily also include data. When the transmission is completed, the FSM transitions to TRANSCEIVER IS BUS MASTER.

It is apparent that multi-level arbitration as in FIG. 7 can be used to increase the number of transceivers arbitrated among for FIG. 5.

TRANSCEIVER IS BUS MASTER

This state is identical to that of FIG. 4.

Advantages of this protocol of FIG. 7 over other methods of bus master arbitration are:
(1) All advantages of FIG. 4; and
(2) Arbitration is accomplished in fewer slots than required by traditional implicit token slot methods.

MULTI-LEVEL RESERVATION CSMA PROTOCOL (FIG. 8)

Figure 8A:
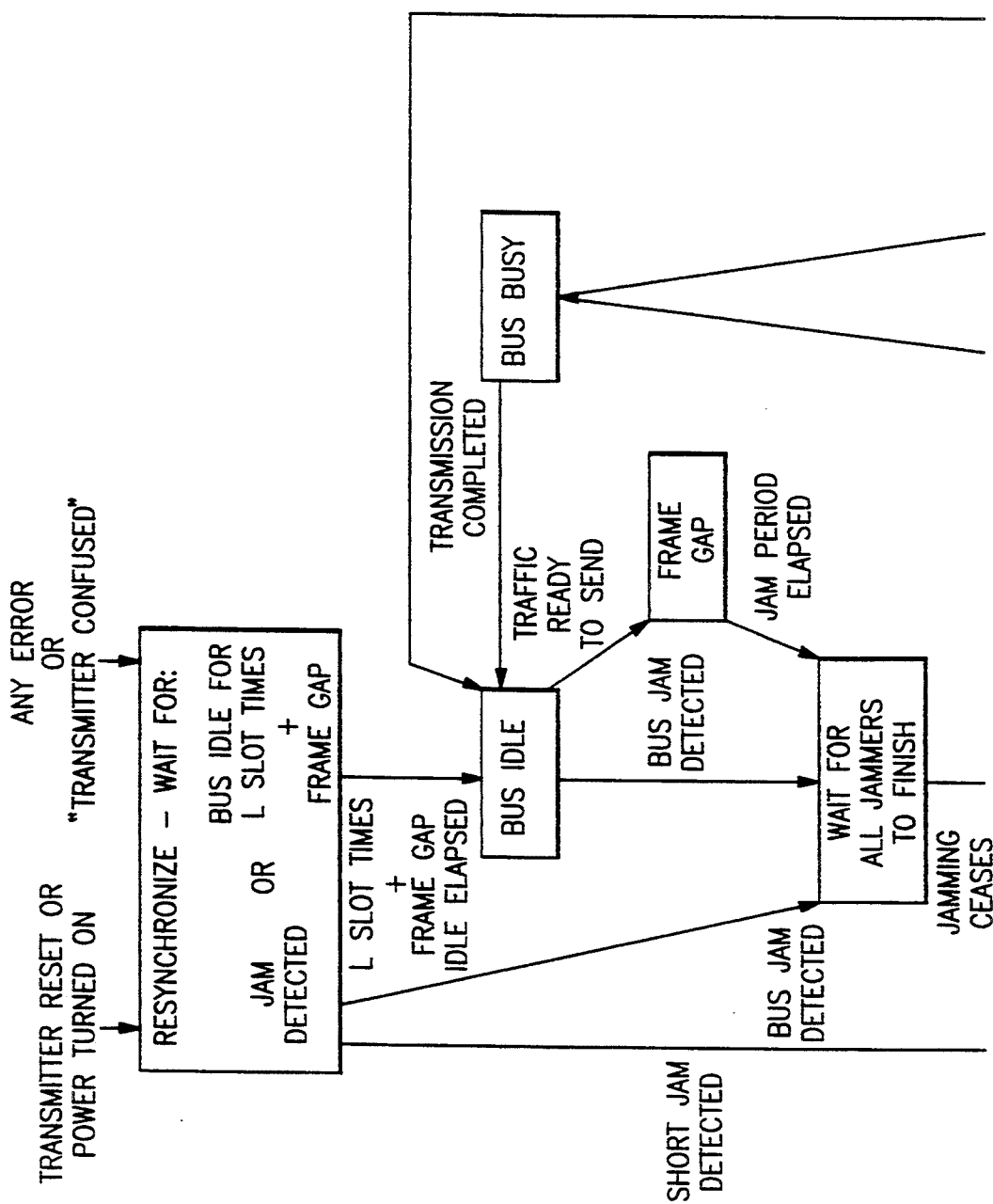
FIG. 8 is a finite state diagram for implementing operation of a Reservation CSMA implicit token media access protocol with fixed priorities and multi-level arbitration that idles the bus after each transmission.
Figures 8, 8B:
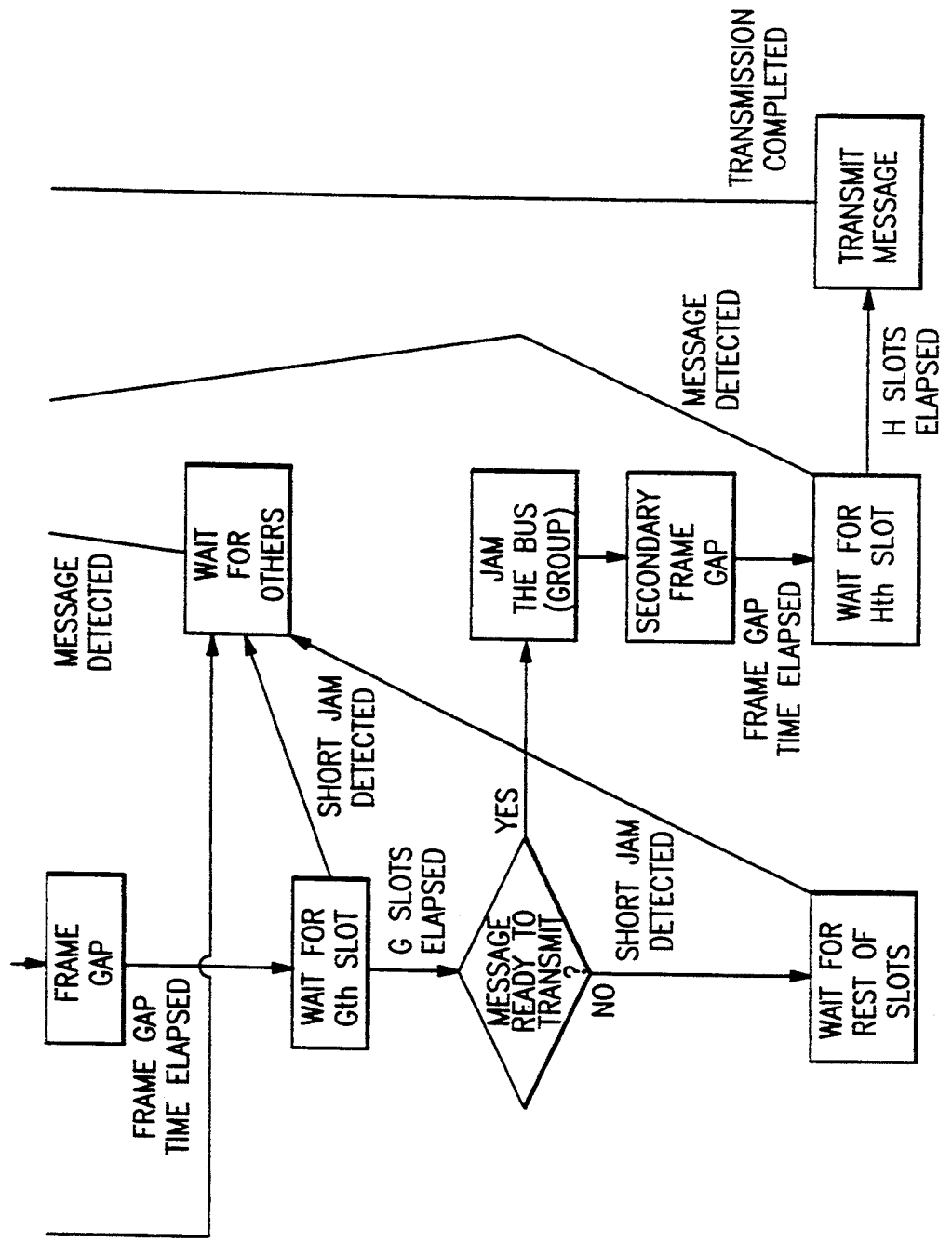

FIG. 8 is an FSD for implementing operation of a Reservation CSMA implicit token media access protocol with fixed priorities and multi-level arbitration that idles the bus after each transmission. Each transceiver contains an implementation of the FSD; therefore, the FSD shown is from the point of view of a single transceiver.

This protocol is similar in capability to binary countdown protocols using bit dominance (e.g., CAN). However, it does not require the medium to support bit dominance. The importance of the mechanism described by FIG. 8 is that it combines the multi-level bus master arbitration method of FIG. 7 with the Reservation CSMA protocol of FIG. 6 to implement a multi-level arbitration Reservation CSMA protocol.

The notation of FIG. 7 applies to FIG. 8. Additionally, J designates the maximum value assigned to G+1 for any transceiver in the system (i.e., the maximum number of group/primary slots). K designates the maximum value assigned to H plus 1 for any transceiver in the system (i.e., the maximum number of secondary slots). L represents the maximum of J and K (i.e., the maximum number of slots in any slot progression).

RESYNCHRONIZE

This state corresponds to the same state of FIGS. 6 and 7. The maximum idle period is L slot times plus a frame gap.

BUS IDLE

This state is identical to that of FIG. 6.

JAM THE BUS

This state is identical to that of FIG. 6.

WAIT FOR ALL JAMMERS TO FINISH

This state is identical to that of FIG. 6.

The transceivers are synchronized when leaving the state WAIT FOR ALL JAMMERS TO FINISH since the end of the last jamming signal is the synchronizing event.

FRAME GAP

This state is identical to that of FIG. 6.

WAIT FOR Gth SLOT

This state is identical to the corresponding state of FIG. 7 except that if a short jam is detected the FSD transitions to WAIT FOR OTHERS.

WAIT FOR OTHERS

This state corresponds to NOT THE BUS MASTER in FIG. 7. If the FSD reaches WAIT FOR OTHERS, then some other transceiver group is undergoing a secondary slot arbitration process. This FSD then waits for a message to be sent by some other transceiver. In proper operation, this other message will be detected within a short jam time plus a frame gap plus K slot times.

MESSAGE READY TO TRANSMIT?

This state is identical to the corresponding state of FIG. 6 except that if there is a message to transmit, the FSD transitions to JAM THE BUS (GROUP).

JAM THE BUS (GROUP)

This state is similar to that of FIG. 7.

SECONDARY FRAME GAP

This state is similar to that of FIG. 7.

WAIT FOR Hth SLOT

This state is similar to that of FIG. 7.

TRANSMIT MESSAGE

This state is similar to that of FIG. 7 except that a data message is provided rather than a bus ownership message.

WAIT FOR REST OF SLOTS

This state corresponds to WAIT FOR REST OF SLOTS in FIG. 6. In proper operation, the number of remaining slots will not exceed J-G. The FSD transitions to WAIT FOR OTHERS if a short jam is detected.

BUS BUSY

This state is similar to that of FIG. 6.

IDLE-AVOIDING RESERVATION CSMA PROTOCOL (FIG. 9)

Figures 9, 9B:
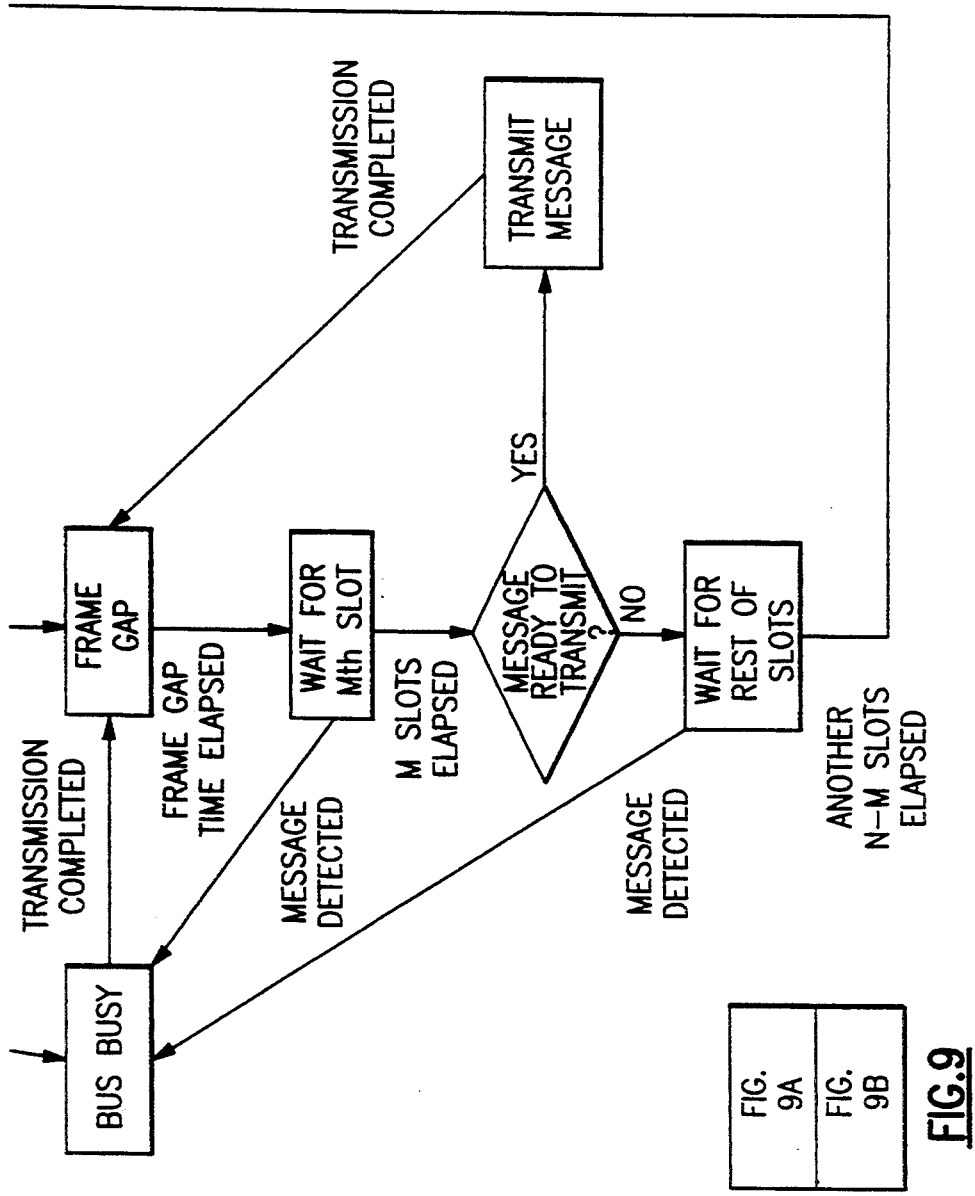
FIG. 9 is a finite state diagram for implementing operation of a Reservation CSMA implicit token media access protocol with fixed priorities that avoids the bus idle state while messages remain to be transmitted.

FIG. 9 is an FSD for implementing operation of a Reservation CSMA implicit token media access protocol with fixed priorities that avoids the bus idle state while messages remain to be transmitted. Each transceiver contains an implementation of the FSD shown in the FSD; therefore, the FSD is from the point of view of a single transceiver.

The importance of the mechanism described by FIG. 9 is that it uses the RCSMA protocol capability of FIG. 6, but increases efficiency of bus usage by avoiding the bus idle state, and therefore bus jams, when messages remain to be transmitted. The key idea is to transition from BUS BUSY and TRANSMIT MESSAGE into the FRAME GAP state, starting a new slot progression at the end of each message. This improvement paves the way for implementing rotating priorities in FIG. 10.

The notation of FIG. 6 applies to FIG. 9.

RESYNCHRONIZE

This state is identical to the corresponding state of FIG. 6 with the following additional capability. If a message is detected on the bus, the FSM transitions to BUS BUSY. This additional transition is added so that a resynchronized FSD can enter the protocol without waiting for the bus to go idle (waiting for an idle period may take a long time on a heavily loaded network).

BUS IDLE

This state is similar to that of FIG. 6.

JAM THE BUS

This state is similar to that of FIG. 6.

WAIT FOR ALL JAMMERS TO FINISH

This state is similar to that of FIG. 6.

The transceivers are synchronized when leaving the state WAIT FOR ALL JAMMERS TO FINISH since the end of the last jamming signal is the synchronizing event.

FRAME GAP

This state is similar to that of FIG. 6.

WAIT FOR Mth SLOT

This state is similar to that of FIG. 6.

MESSAGE READY TO TRANSMIT?

This state is similar to that of FIG. 6.

TRANSMIT MESSAGE

This state is similar to the corresponding state of FIG. 6 with the exception that the FSM transitions to FRAME GAP when the transmission is done. All transceivers use the end of a transmission as a synchronization point just as a jam is used as a synchronization because of the transition to the frame gap state (because only one transceiver can be transmitting a message at any given time, the end of the transmission is guaranteed to be a unique synchronization point).

WAIT FOR REST OF SLOTS

This state is similar to the corresponding state of FIG. 6, except that the transition to BUS IDLE is added when N-M slots are exceeded, which happens in normal operation whenever there are no messages to be sent.

BUS BUSY

This state is similar to the corresponding state of FIG. 6 with the exception that the FSM transitions to FRAME GAP when the transmission is done.

Advantages of this protocol of FIG. 9 over other explicit protocol methods are those of FIG. 6 plus the advantage that time spent jamming is eliminated when the bus is busy with multiple messages.

RESERVATION CSMA PROTOCOL WITH ROTATING SLOTS (FIG. 10)

Figure 10A:
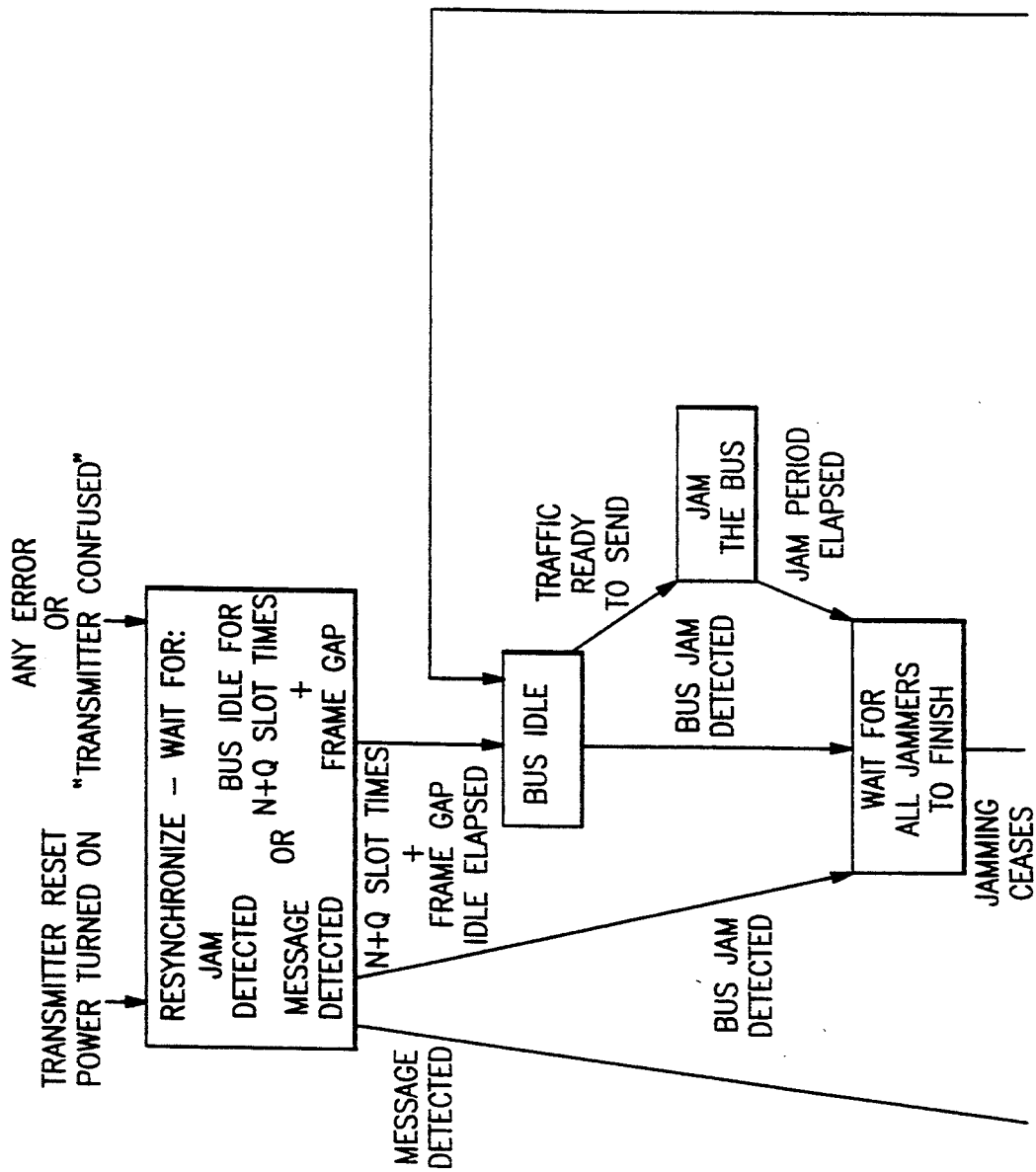
FIG. 10 is a finite state diagram for implementing operation of an RCSMA media access protocol with a combination of fixed priority slots and rotating priorities.
Figure 10B:
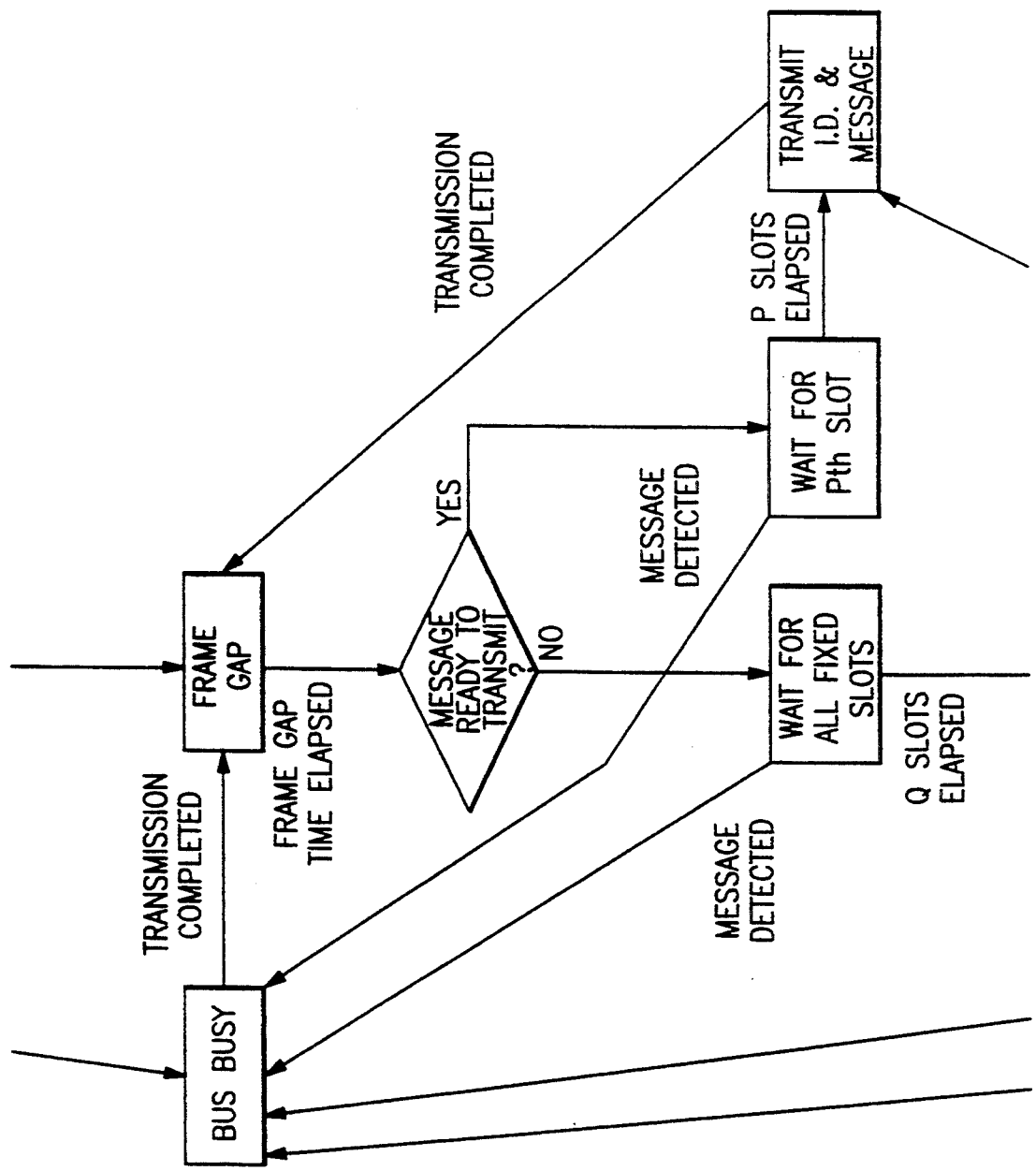
Figure 10C:
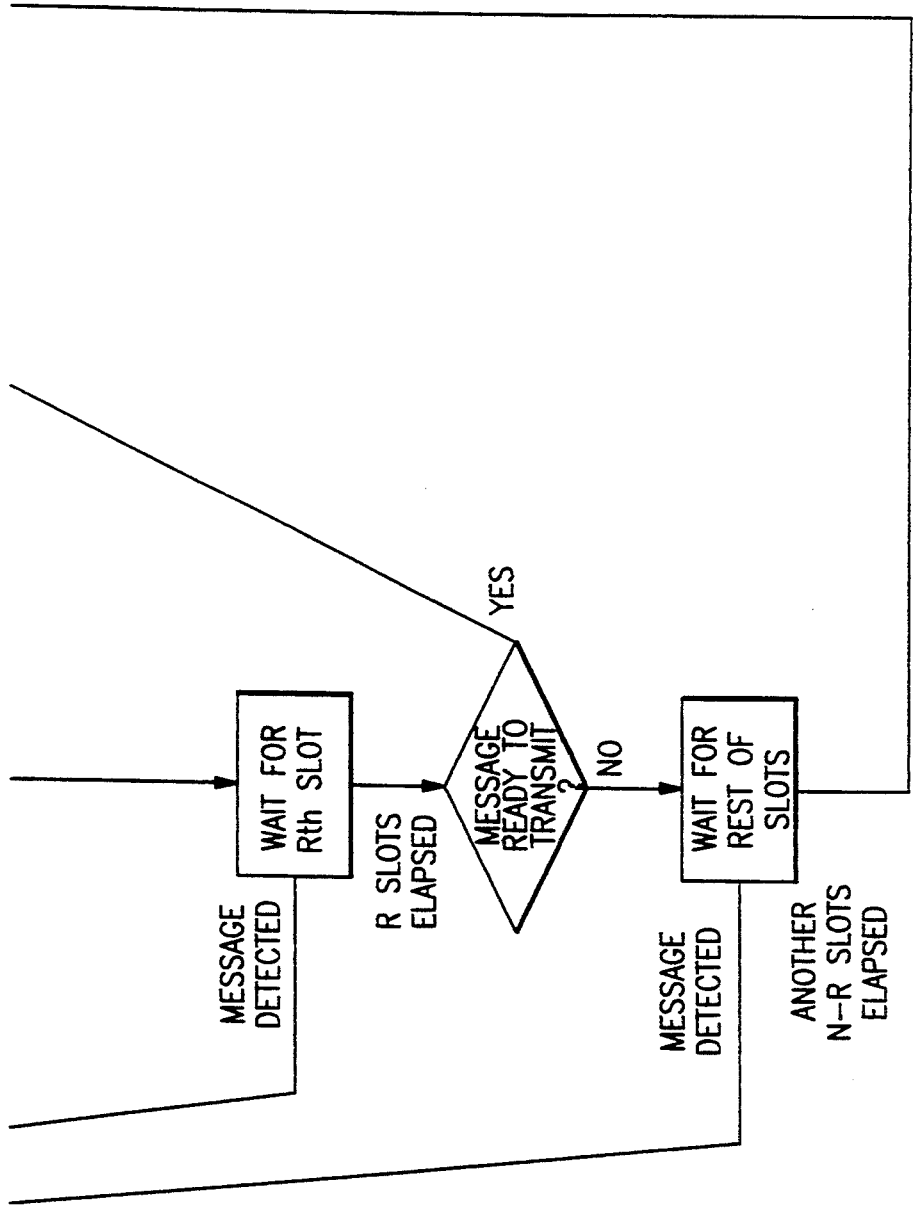

FIG. 10 is an FSD for implementing operation of an RCSMA media access protocol with a combination of fixed priority slots and rotating priority slots. Each transceiver contains an implementation of the FSM in a finite state machine (FSD); therefore, the FSD is from the point of view of a single transceiver.

The importance of the mechanism described by FIG. 10 is that it uses the RCSMA protocol capability of FIG. 9, but provides for both fixed and rotating implicit token slots. Rotating slots implement round-robin access for transceivers, ensuring fair access to the network. It is desirable to assign fixed slots to specific high-priority message types and a rotating slot to each transceiver (it is up to the system designer to ensure that no two transceivers contend for a fixed slot by issuing the same message type). It will be apparent to one skilled in the art that any combination of a plurality of fixed and rotating slot groups with different slots used for transceivers, messages, or a combination may be implemented using similar techniques.

The following notation applies to FIG. 10:

There are N transceivers coupled to the bus (not all of which need be operational or active).

There are Q different fixed priority slots allocated, with high-priority messages assigned a priority P between 0 and Q-1. There are N rotating implicit token slots following the fixed priority slots. Each transceiver is assigned a unique number M, between 0 and N-1 inclusive, corresponding to its unique transceiver ID number.

Each transceiver has a variable called LAST ID that records the value of the last-active transceiver ID to implement rotating slots. R is a temporary variable for computing the relative slot position within a set of rotating implicit token slots.

RESYNCHRONIZE

This state is identical to the corresponding state of FIG. 9 with the exception that the bus idle waiting time is N+Q slots plus a frame gap, corresponding to the longest time that the bus can be inactive during the arbitration procedure.

BUS IDLE

This state is similar to the corresponding state of FIG. 9.

JAM THE BUS

WAIT FOR ALL JAMMERS TO FINISH

This state is similar to the corresponding state of FIG. 9 with the addition that its LAST ID variable is set to the value N-1.

FRAME GAP

This state is similar to the corresponding state of FIG. 9.

PRIORITY MESSAGE READY TO TRANSMIT?

After the frame gap, each transceiver determines whether it has a high priority message to transmit in a fixed priority implicit token slot. If it does, it sets its internal value of P to the highest priority among the plurality of outgoing high priority messages in its transmission queue and transitions to WAIT FOR Pth SLOT. Otherwise, it transitions to WAIT FOR ALL FIXED SLOTS.

WAIT FOR Pth SLOT

WAIT FOR Pth SLOT is similar to WAIT FOR Mth SLOT in FIG. 9. In WAIT FOR Pth SLOT, the FSD has ascertained that it has a high priority message available for transmission. It waits for the Pth slot (where P is the priority of the message to be transmitted) and transitions to TRANSMIT I.D. & MESSAGE. If some other transceiver has a smaller value of P, it will transmit first, causing the current FSD to transition to BUS BUSY.

WAIT FOR ALL FIXED SLOTS

WAIT FOR ALL FIXED SLOTS is reached when the FSD has no high priority messages to transmit. The FSD waits for Q slots to elapse, monitoring the bus for the presence of a high priority message from some other transceiver. If another transceiver sends a message, the FSD transitions to BUS BUSY. Otherwise, the FSD transitions to WAIT FOR Rth SLOT to begin a rotating slot progression.

WAIT FOR Rth SLOT

Upon entering WAIT FOR Rth SLOT, the FSD computes the value R based on its transceiver number M and the transceiver number of the last active transceiver using the formula:

$$(M - LAST\_ID - 1) \bmod N$$

Thus, the transceiver numbered one higher than the last active transceiver is assigned an R value of 0, and the last active transceiver is assigned an R value of N-1.

If a message from some other transceiver is received, the FSD transitions to BUS BUSY. If all R slots elapse without a message detected, the FSD transitions to the MESSAGE TO TRANSMIT? state.

MESSAGE READY TO TRANSMIT?

This state is similar to that of FIG. 9.

TRANSMIT I.D. & MESSAGE

This state is similar to TRANSMIT MESSAGE of FIG. 9. In addition to transmitting a message, the FSD transmits its own sender ID (i.e., its value of M) if it is sending a rotating-slot message. If it is sending a priority message, it transmits the value of LAST ID so that slot rotation continues without being disturbed by the intrusion of a high-priority message.

WAIT FOR REST OF SLOTS

This state is similar in operation to the corresponding state of FIG. 9 except that number of slots remaining in the slot rotation is N-R slots.

The transceivers are synchronized when they are all in the same state of their respective finite state diagrams. The state that this occurs at the state following the state WAIT FOR ALL JAMMERS TO FINISH since the end of the last jamming signal is the synchronizing event.

BUS BUSY

This state is similar to that of FIG. 9.

Advantages of this protocol of FIG. 10 over other explicit protocol methods are those of FIG. 9 plus a combination of fixed and rotating slots is implemented to permit fast service for high priority messages with fair access for low-priority messages.

RESERVATION CSMA PROTOCOL WITH MULTI-LEVEL ROTATING SLOTS (FIG. 11)

Figure 11B:
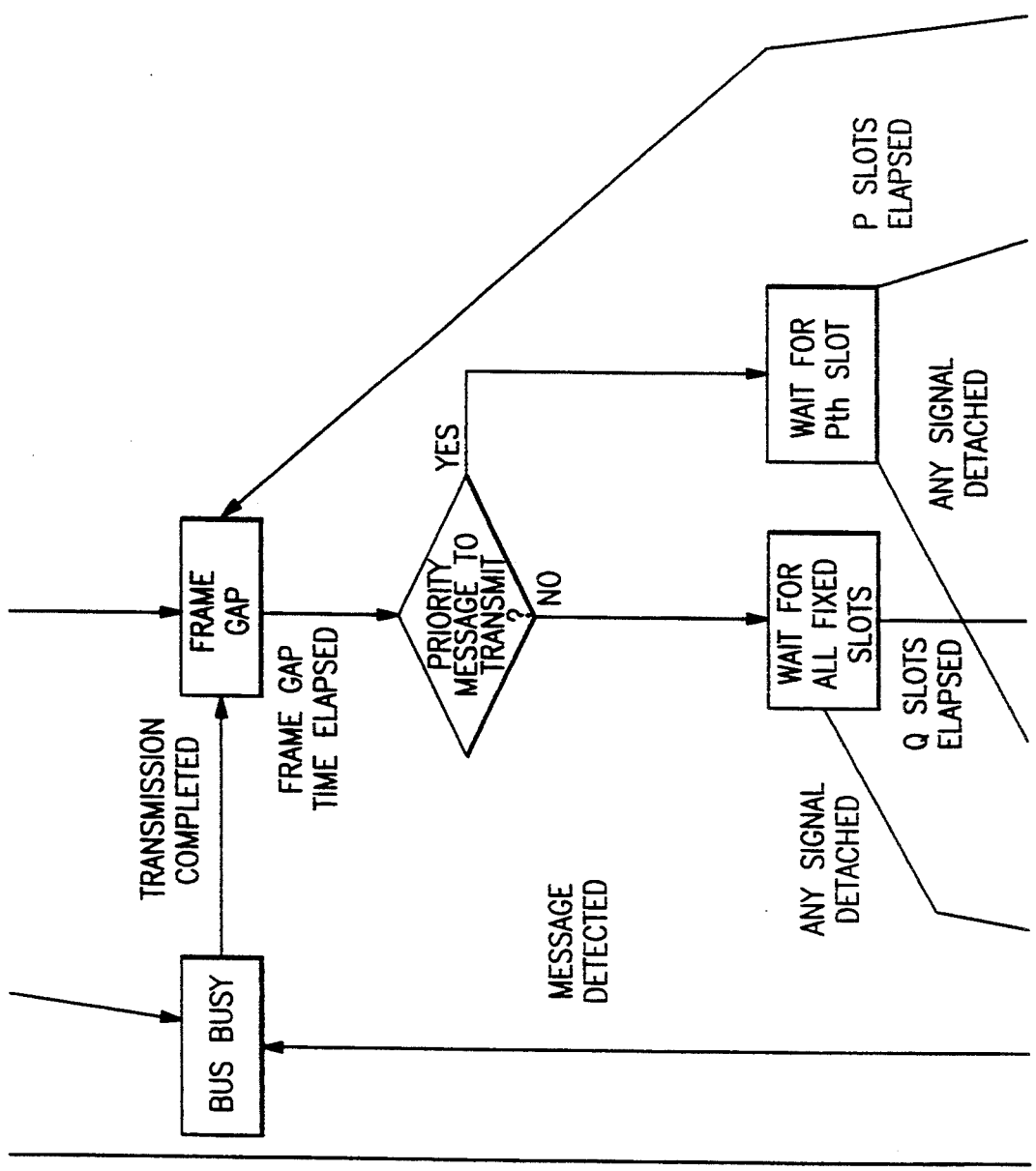
FIG. 11 is a finite state diagram for implementing operation of an RCSMA media access protocol with both fixed priority and two levels of rotating priority slot arbitration.

FIG. 11 is a finite state diagram for implementing operation of an RCSMA media access protocol with both a fixed priority slot rotation and two levels of rotating priority slot arbitration. Each transceiver contains an implementation of the FSD; therefore, the FSD is from the point of view of a single transceiver.

The importance of the mechanism described by FIG. 11 is that it combines the multi-level RCSMA protocol of FIG. 8 with the rotating slot capability of FIG. 10 to produce a protocol that uses fixed as well as rotating slots with multi-level arbitration for the rotating slots. It will be apparent to one skilled in the art that any combination of a plurality of fixed and rotating slot groups with different slots used for transceivers, messages, or a combination, and multi-level capabilities within each group, can be implemented using similar techniques.

The notation of both FIG. 8 and FIG. 10 applies to FIG. 11. Additionally, W represents the maximum of the values Q+J+K (i.e., the longest sequence of slots in the protocol). Y and Z are temporary variables for computing slot positions.

RESYNCHRONIZE

This state is similar to the corresponding state of FIG. 9 with the exception that the bus idle waiting time is W slots plus a frame gap, corresponding to the longest time that the bus can be inactive during the arbitration procedure.

BUS IDLE

This state is similar to that of FIG. 10.

JAM THE BUS

This state is similar to that of FIG. 10.

WAIT FOR ALL JAMMERS TO FINISH

This state is similar to that of FIG. 10.

The transceivers are synchronized when they are all in the same state of their respective finite state diagrams. The state that this occurs at the state following the state WAIT FOR ALL JAMMERS TO FINISH since the end of the last jamming signal is the synchronizing event.

FRAME GAP

This state is similar to that of FIG. 10.

PRIORITY MESSAGE READY TO TRANSMIT?

This state is similar to that of FIG. 10.

WAIT FOR Pth SLOT

This state is similar to that of FIG. 10.

WAIT FOR ALL FIXED SLOTS

This state is similar to that of FIG. 10.

WAIT FOR Yth SLOT

Upon entering WAIT FOR Yth SLOT, the FSD computes primary slot position Y and secondary slot position Z based on its transceiver number M and the number of the last active transceiver using integer arithmetic and the following formulae:

$$R = (M - LAST\_ID - 1) \bmod N \quad Y = R/J$$
$$Z = R - (Y*J)$$

Thus, the transceiver numbered one higher than the last active transceiver is assigned to the first primary slot and the first secondary slot.

If a signal from some other transceiver is received, the FSD transitions to WAIT FOR MESSAGE. If all Y slots elapse without a signal being detected, the FSD transitions to the MESSAGE READY TO TRANSMIT? state.

MESSAGE READY TO TRANSMIT?

This state is similar to the corresponding state of FIG. 8.

JAM THE BUS (GROUP)

This state is similar to the corresponding state of FIG. 8.

SECONDARY FRAME GAP

This state is similar to the corresponding state of FIG. 8.

WAIT FOR Zth SLOT

This state is similar to the WAIT FOR Hth SLOT state of FIG. 8, except that the value Z is used instead of H.

TRANSMIT I.D. & MESSAGE

This state is similar to the corresponding state of FIG. 10.

WAIT FOR REST OF SLOTS

This state is similar in operation to the corresponding state of FIG. 10 except that number of slots remaining in the slot rotation is J-Y slots.

WAIT FOR MESSAGE

In the WAIT FOR MESSAGE state, the FSD waits for jamming and implicit token slots to be completed and a message to actually begin, then transitions to BUS BUSY.

BUS BUSY

This state is similar to the corresponding state of FIG. 10.

Advantages of this protocol of FIG. 11 over other protocol methods are those of FIG. 8 plus those of FIG. 10 plus a combination of fixed and multi-level rotating slots is implemented to permit fast service for high priority messages with fair access for low-priority messages as well as support for a large number of transceivers.

We claim:

1. A synchronous time division multiplexing method for communicating between a plurality of transceivers interconnected by a communications medium consisting of a single signal line, said plurality of transceivers being peers in that none is a predetermined central bus master, comprising: assigning to each of said plurality of transceivers a unique number in a sequence of numbers including all of said plurality of transceivers;

when communication on said communications medium is to begin, providing a jam signal from one or more of said plurality of transceivers onto said communications medium, such that no message other than said jam signal may exist on said communications medium;

receiving said jam signal at each of said plurality of transceivers, each of said plurality of transceivers, in response to said jam signal, waiting for the end of said jam signal;

each one of said plurality of transceivers, upon sensing the end of said jam signal, waiting for a first period of time equal to a predetermined frame gap time period summed with a first number of predetermined message slice time periods, said number equaling the number of said transceivers ahead of said one transceiver in said sequence, and thereafter transmitting a message if there is a message for said one transceiver to transmit; and each one of said plurality of transceivers, after a second period of time from the end of said jam signal, providing said jam signal onto said communications medium, said second period of time being equal to said predetermined frame gap time period summed with a second number of said predetermined message slice time periods, said second number equaling the total number of said plurality of transceivers.

2. A synchronous time division multiplexing method for communicating between a plurality of transceivers interconnected by a communications medium consisting of a single signal line, said plurality of transceivers being peers in that none is a predetermined central bus master, comprising:

assigning to each of said plurality of transceivers a unique number in a sequence of numbers including all of said plurality of transceivers;

when communication on said communications medium is to begin, providing a jam signal from one or more of said plurality of transceivers onto said communications medium, such that no message other than said jam signal may exist on said communications medium;

receiving said jam signal at each of said plurality of transceivers, each of said plurality of transceivers, in response to said jam signal, waiting for the end of said jam signal;

each one of said plurality of transceivers, upon sensing the end of said jam signal, waiting for a first period of time equal to a predetermined frame gap time period summed with a first number of message slice time periods, said number equaling the number of said transceivers ahead of said one transceiver in said sequence, and thereafter transmitting a message if there is a message for said one transceiver to transmit; and after a second period of time from the end of said jam signal, providing said jam signal onto said communications medium, said second period of time being equal to said predetermined frame gap time period summed with a second number of said message slice time periods, said second number equaling the total number of said plurality of transceivers;

each of said message slice time periods being of a fixed predetermined extent whenever the transceiver associated therewith transmits a message;

if any one of said transceivers does not have a message to transmit, said communications medium assuming an idle condition during a message slice time period associated with said any one transceiver, each of said plurality of transceivers responsive to said idle condition existing for a third predetermined period of time to end the current message time slice period and commence the next message time slice period, said third period of time being less than said fixed predetermined extent.

* * * * *